(12) United States Patent
Tabachnik

(10) Patent No.: US 8,162,124 B2
(45) Date of Patent: Apr. 24, 2012

(54) CURRENCY CHANGER DEVICE FOR USE WITH A POINT OF SALE TERMINAL

(76) Inventor: Bruce M. Tabachnik, Beachwood, OH (US)

( * ) Notice: Subject to any disclaimer, the term of this patent is extended or adjusted under 35 U.S.C. 154(b) by 0 days.

(21) Appl. No.: 12/696,457

(22) Filed: Jan. 29, 2010

(65) Prior Publication Data

US 2010/0198708 A1 Aug. 5, 2010

Related U.S. Application Data

(63) Continuation of application No. 11/734,866, filed on Apr. 13, 2007, now Pat. No. 7,681,707.

(60) Provisional application No. 60/744,898, filed on Apr. 14, 2007.

(51) Int. Cl.
*G07F 7/04* (2006.01)

(52) U.S. Cl. ........ 194/206; 194/229; 194/344; 194/346; 453/3; 453/18

(58) Field of Classification Search .................. 194/206, 194/207, 229, 302, 344, 346, 350; 221/123, 221/124, 224, 236; 209/534; 453/3, 18
See application file for complete search history.

(56) References Cited

U.S. PATENT DOCUMENTS

| | | | | | |
|---|---|---|---|---|---|
| 4,236,639 | A | * | 12/1980 | Boettge et al. | 209/534 |
| 4,411,351 | A | * | 10/1983 | Lowder et al. | 194/212 |
| 5,183,142 | A | * | 2/1993 | Latchinian et al. | 194/206 |
| 5,909,794 | A | * | 6/1999 | Molbak et al. | 194/216 |
| 7,278,527 | B2 | * | 10/2007 | Daout et al. | 194/206 |
| 7,690,495 | B1 | * | 4/2010 | Kolls et al. | 194/350 |
| 2002/0049076 | A1 | * | 4/2002 | Jones et al. | 455/557 |
| 2002/0092727 | A1 | * | 7/2002 | Kato | 194/302 |
| 2002/0100660 | A1 | * | 8/2002 | Stieber et al. | 194/215 |
| 2002/0189920 | A1 | * | 12/2002 | Molbak | 194/347 |
| 2004/0093117 | A1 | * | 5/2004 | Daout et al. | 700/231 |
| 2004/0231956 | A1 | * | 11/2004 | Adams et al. | 194/217 |
| 2004/0251110 | A1 | * | 12/2004 | Jenrick et al. | 194/207 |
| 2005/0256792 | A1 | * | 11/2005 | Shimizu et al. | 705/35 |
| 2006/0060600 | A1 | * | 3/2006 | Sams | 221/197 |
| 2006/0065717 | A1 | * | 3/2006 | Hurwitz et al. | 235/381 |
| 2006/0069642 | A1 | * | 3/2006 | Doran et al. | 705/39 |
| 2007/0007707 | A1 | * | 1/2007 | Abe et al. | 271/97 |
| 2007/0084909 | A1 | * | 4/2007 | Quattrini et al. | 232/64 |
| 2009/0001661 | A1 | * | 1/2009 | Klein et al. | 271/258.01 |

* cited by examiner

*Primary Examiner* — Jeffrey Shapiro

(74) *Attorney, Agent, or Firm* — Mark R. Malek, Esq.; Zies Widerman & Malek

(57) ABSTRACT

A currency changer device is adapted to be used with a point of sale terminal and includes a housing, a coin accepting tray carried by the housing for accepting a plurality of coins in bulk, and a bill accepter carried by the housing for accepting and sorting a plurality of bills in bulk. The currency changer device may also include a respective plurality of first and second currency changer device hardware components. The plurality of second currency changer device hardware components are identical to the respective plurality of first currency changer device hardware components. Both the first and second plurality of currency changer device hardware components include a first and a second coin sorter each in communication with the coin accepting tray, a first and a second plurality of respective coin bins in communication with the respective first and second coin sorters, and a first and a second plurality of bill cassettes in communication with the bill accepter. The currency changer device may also include a coin dispenser and a bill dispenser. The currency changer device is adapted to accept a plurality of unsorted coins in bulk and a plurality of unsorted bills in bulk for a cash transaction, and to dispense change in a cash transaction responsive to commands received from the at least one point of sale terminal.

30 Claims, 11 Drawing Sheets

CURRENCY CHANGER DEVICE FOR USE WITH A POINT OF SALE TERMINAL

RELATED APPLICATIONS

This application is a continuation in part application of U.S. patent application Ser. No. 11/734,866 titled A Drawerless Point of Sale Terminal And Associated Methods by the inventor of the present application, filed on Apr. 13, 2007, which claimed the benefit of U.S. Provisional Patent Application Ser. No. 60/744,898 filed on Apr. 14, 2006, the contents of each of which are incorporated herein in by reference in their entireties.

FIELD OF THE INVENTION

The present invention relates to the field of currency changer devices and, more particularly, to currency changer devices for use with point of sale terminals.

BACKGROUND OF THE INVENTION

Existing point of sale retail management systems accept many methods of payment including cash, credit card, gift card, and even checks. With respect to cash transactions, access to a cash drawer may present security issues. More particularly, the opening of a cash drawer exposes cash to a cashier, or other user, in order to perform the steps of physically accepting cash and removing currency to provide change to the user.

In systems that do not utilize a cashier, i.e., self check-out systems, this is not as much of a problem. An example of such a system is disclosed in U.S. Pat. No. 6,857,505 to Mason, et al. Such a self-service check out terminal may be operated by a customer without the aid of a check-out clerk. Accordingly, during operation of the self-service check-out terminal, the customer may scan individual items for purchase across a scanner and then place the items for purchase into a bag or other transporting device. The customer may then pay for the purchase at the check-out terminal or at a central payment area staffed by an employee. The system includes a currency dispenser that dispenses an amount of change due to a customer in response to a dispenser control signal received from the processing unit. Such a unit, however, requires currency to be deposited in a sorted fashion. In other words, a customer must insert bills into the currency dispenser one at a time.

U.S. Pat. No. 5,606,157 to Awatsu, et al, discloses a cash processing system for automatically performing cash handling operations. Such a system is generally used in connection with automated teller machines (ATM's). The system includes a detachable cash safe that holds bills for a cash transaction. The system fails, however, to allow for cash bills to be deposited in bulk and separated accordingly.

U.S. Pat. No. 6,536,664 to Nordqvist, et al, discloses a payment processing system that enables retrofitting of an existing cash register with an automatic payment processing device. The system includes a payment processing device having a currency dispenser and a data port for assessing bank notes and coins and for supplying the proper amount of change to a user. This device also suffers from the deficiency of not being able to accept cash in bulk. In other words, a user must insert bills one at a time so that the bills can be identified and routed.

U.S. Pat. No. 5,924,079 to Brown discloses a cash register that prevents theft by restricting access to currency. The system includes a key pad for entering sales information, a currency receiving slot for receiving currency directly from a customer, an enclosed cash drawer coupled with the currency receiving slot for depositing the received currency and a currency dispensing tray responsive to the sales computing device for dispensing currency directly to the customer when the received currency amount exceeds the sales amount. Again, however, such a system does not allow a customer to deposit cash in bulk. Instead, the customer must deposit the currency individually, i.e., each bill must be deposited individually.

A point of sale terminal that accepts bank notes is also disclosed in U.S. Pat. No. 4,310,885 to Azcua, et al. This system includes a plurality of bill trays so that a user may separate and sort bank notes prior to inserting the bank notes into the point of sale terminal. U.S. Pat. No. 4,253,016 discloses an apparatus for dispensing and receiving bank notes. Such an apparatus, however, only accepts the bank notes one at a time.

One downfall of some point of sale terminals that accept large sums of cash is that the currency contained within the currency changer device is generally not available to the proprietor until the funds are deposited into a financial institution, i.e., a bank. U.S. Published Patent Application No. 2001/0020638 by Uematsu et al. discloses a store sales proceed depositing machine that includes a deposit operation panel at one side, a storage unit for storing deposited cash, and an external communications link for notifying a cash logistics company of deposit data. This type of system is directed to the ATM field of technology to authorize cashing by confirmation of a balance in a savings account of a person withdrawing cash.

U.S. Published Patent Application No. 2007/0100750 by Hartfield et al. discloses an automatic settlement of user accounts with creditors from a transaction kiosk. The transaction kiosk collects cash from a user and electronically negotiates with a user's creditor to settle a balance on an account with the creditor. This system is directed to allowing users to pay down balances owed to creditors, i.e., credit cards, using cash, and eliminating the need to involve a person in the transaction.

It is also preferable that a housing for a currency changer device. U.S. Published Patent Application No. 2007/0274036 to Walsh et al. discloses a noise proofed ventilated air intake chamber for electronic equipment enclosures. Such a device is quite complicated as it requires for air to be supplied to the enclosure and air to be removed from the enclosure through acoustic chambers attached to the enclosure.

Access to components within a housing may be important for maintenance purposes. Several point of sale terminals and associated currency changer devices include a plurality of components carried by the housing. It may be necessary to maintain some of the components, but the components may be difficult to reach within a compact space. U.S. Pat. No. 7,367,493 to Lute et al. discloses a type of enclosure for use with an automated banking machine. The enclosure includes a rollout tray supporting upper banking machine components.

SUMMARY OF THE INVENTION

In view of the foregoing background, it is therefore an object of the present invention to provide a currency changer device having enhanced efficiency. It is also an object of the present invention to provide a currency changer device that advantageously accepts currency in bulk. It is further an object of the present invention to provide a currency changer device that restricts access to cash. It is still further an object of the present invention to provide a currency changer device that is self replenishing. It is yet another object of the present invention to provide a currency changer device having enhanced reliability. It is another object of the present invention to provide a currency changer device that allows for deposits of currency stored within the currency changer device to be remotely made to a bank account. It is also an object of the present invention to provide a currency changer device including a housing having noise reduction features so as to reduce noise associated with cash transactions. It is further an object of the present invention to provide a currency changer device that can be remotely located at any given time.

These and other objects, features and advantages according to the present invention are provided by a currency changer device for use with at least one point of sale terminal. The currency changer device includes a housing, a coin accepting tray carried by the housing for accepting a plurality of coins in bulk and a bill accepter carried by the housing for accepting a plurality of bills in bulk. The currency changer device may also include a respective plurality of first currency changer device hardware components and second currency changer device hardware components each carried by the housing. The respective plurality of second currency changer device hardware components are identical to the respective plurality of first currency changer device hardware components.

The respective plurality of first and second currency changer device hardware components include a first and a second coin sorter each in communication with the coin accepting tray and a first and a second plurality of respective coin bins in communication with the respective first and second coin sorters for receiving a respective plurality of similar coins. The respective plurality of first and second currency changer device hardware components also includes a first and a second plurality of bill cassettes in communication with the bill accepter for receiving and dispensing a respective plurality of similar bills.

The currency changer device according to the present invention may also include a coin dispenser carried by the housing and in communication with the first and second plurality of respective coin bins to dispense a plurality of coins and a bill dispenser carried by the housing and in communication with the first and the second plurality of bill cassettes to dispense a plurality of bills. The currency changer device may be adapted to accept a plurality of unsorted coins in bulk and a plurality of unsorted bills in bulk for a cash transaction. The currency changer device may also be adapted to dispense change in a cash transaction responsive to commands received from the at least one point of sale terminal.

The currency changer device may also include a controller in communication with each of the respective plurality of first currency changer device hardware components and second currency changer device hardware components. The currency changer device may also include a currency changer device hardware component monitoring system in communication with the controller and each of the respective plurality of first and second currency changer device hardware components. The currency changer device hardware components monitoring device may be adapted to monitor each of the respective plurality of first and second currency changer device hardware components. The currency changer device hardware component monitoring system may transmit a malfunction signal upon detecting a malfunction of one of the plurality of first or second currency changer device hardware components to define a malfunctioning component. Upon receipt of a malfunction signal, the malfunctioning component may be deactivated. Thereafter, currency transactions may be rerouted to a backup component relating to at least one of the first and second plurality of currency changer device hardware components in place of the malfunctioning component. This configuration advantageously provides redundancy to the currency changer device, thereby enhancing its reliability.

The currency changer device may be adapted for use with two point of sale terminals. In such a configuration, currency may be selectively deposited into either the coin bins and bill cassettes associated with the first currency changer device hardware components or the coin bins and bill cassettes associated with the second currency changer device hardware components. The currency changer device may include a load balancing system in communication with the controller to balance the amount of currency being deposited into and dispensed out of the coin bins and bill cassettes associated with the first currency changer device hardware components with the currency being deposited into and dispensed out of the coin bins and bill cassettes associated with the second currency changer device hardware components. This configuration also enhances performance of the currency changer device by ensuring that the redundant components built into the currency changer device are properly utilized.

The currency changer device may also include a banking interface in communication with the controller and a global communications system. The banking interface may be adapted to allow for a predetermined amount of currency contained within the currency changer device to be deposited into a preselected bank account at a preselected bank. Upon provisionally depositing the predetermined amount of currency, the predetermined amount of currency becomes property of the preselected bank. The predetermined amount of currency can be provisionally deposited remotely via the global communications network. The banking interface feature of the currency changer device advantageously allows for funds stored within the currency changer device to be readily deposited and made available for other purposes without the need to transport those funds to the preselected bank.

The currency changer device may also include a Global Positioning System (GPS) carried by the housing and in communication with the controller and a global communications network so that a location of the currency changer device may be remotely monitored. This advantageously ensures that a location of the currency changer device may be readily ascertained. Such a feature can prove to be especially valuable in the case of theft of the currency changer device.

The currency changer device may also include a frame carried by the housing. Each of the plurality of first and second currency changer device hardware components may be carried by the frame. The frame may be slidably connected to the housing. The housing may include a plurality of rollers positioned to engage portions of the frame so that the frame can be slidably moved between an extended position and an inserted position. The extended position may be defined as at least a portion of the frame being positioned exterior the housing. The inserted position may be defined as at least a portion of the frame being positioned within the housing. This advantageously allows for interior portions of the currency changer device to be readily accessed for maintenance. For example, the plurality of first and second currency changer device hardware components may be readily accessed to enhance maintenance of the currency changer device. The currency changer device may include sound insulating material carried by interior wall portions of the housing. Sound insulating materials advantageously decrease noise levels that may be associated with cash transactions.

The currency changer device may also include a coin intake cover mechanism carried by the housing adjacent the coin accepting tray and in communication with the controller. The coin intake cover mechanism is adapted to be moved between an uncovered position and a covered position responsive to signals received from the controller. More specifically, the coin intake cover mechanism may be moved to the uncovered position when the currency changer device is ready to accept coins and the covered position when the currency changer device is not ready to accept coins.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
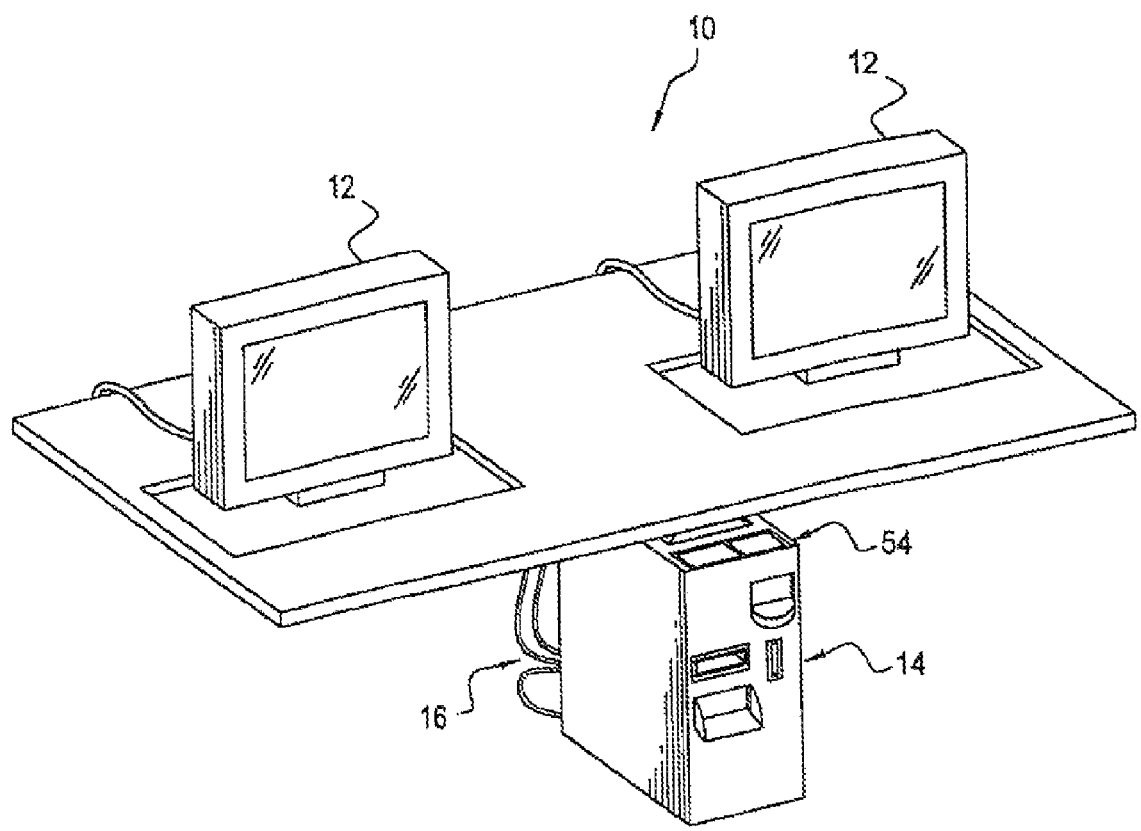
FIG. 1 is a perspective view of a drawerless point of sale terminal according to the present invention.

Referring initially to FIG. 1, a drawerless point of sale terminal 10 is now described in greater detail. The drawerless point of sale terminal 10 includes a point of sale terminal 12 and a currency changer device 14. As illustrated in FIG. 1, the drawerless point of sale terminal 10 may include more than one point of sale terminal 12. Accordingly, and as illustrated, a pair of point of sale terminals 12 may be connected to a single currency changer device 14. The system 10 of the present invention therefore advantageously enhances efficiency of point of sale retail management systems while simultaneously enhancing security of cash during cash transactions by preventing access to the cash.

The currency changer device 14 is preferably in communication with the point of sale terminals 12. More specifically, a communications link 16 extends from the currency changer device 14 to each point of sale terminal 12. The communications link 16 may, for example, be provided by a USB cable, or any other similar type of communications link suitable for enabling the currency changer device 14 to communicate with the point of sale terminal 12.

The currency changer device 14 is adapted to accept cash in bulk for a cash transaction. The currency changer device 14 is also adapted to dispense change in a cash transaction responsive to commands received from the point of sale terminal 12. The currency changer device 14 includes a housing 18. The housing 18 may be similar to a housing for a computer processing unit (CPU) or any other type of housing as understood by those skilled in the art.

The currency changer device 14 may also include a coin accepting tray 20 carried by the housing 18. The coin accepting tray 20 accepts a plurality of coins in bulk in a cash transaction. The currency changer device 14 may also include a coin sorter 22 carried by the housing 18. The coin sorter 22 is in communication with the coin accepting tray 20. More specifically, the coin sorter 22 sorts the plurality of coins that are deposited in bulk into the coin accepting tray 20 by a user. The coins are preferably sorted by denomination. After the coins are sorted in the coin sorter 22, the coins are deposited into a respective plurality of coin bins 24.

The coin bins 24 are preferably individual coin bins carried by the housing 18 in communication with the coin sorter 22 for receiving a respective plurality of similar denomination coins. The coin bins 24 preferably include a first coin bin 24a for pennies, a second coin bin 24b for nickels, a third coin bin 24c for dimes, and a fourth coin bin 24d for quarters. Those skilled in the art, however, will appreciate that any type of coin bins may be included for any type of currency, i.e., U.S., or other currency. Further, additional coin bins may be included to accept other types of coins, such as 50-cent pieces, and dollar coins, as understood by those skilled in the art.

The currency changer device 14 may also include a coin rejection dispenser 26 in communication with the coin accepting tray 20. The coin rejection dispenser advantageously dispenses coins rejected by the currency changer device. Such coins are likely invalid coins, or coins not accepted as currency by the currency changer device 14. Accordingly, the currency changer device 14 of the present invention advantageously prevents fraudulent coins from being deposited as payment in a cash transaction.

The currency changer device 14 also includes a coin dispenser 28 carried by the housing 18. The coin dispenser 28 is in communication with the plurality of respective coin bins 24 to dispense coins responsive to the point of sale terminal 12. More particularly, the coin dispenser 28 dispenses the proper amount of coins as determined by a point of sale terminal 12. In other words, during a cash transaction, the point of sale terminal 12 determines the amount of change due to a user after the user deposits cash for payment of the cash transaction. Therefore, after the amount of change is calculated by the point of sale terminal 12, the proper number of coins necessary for dispensing the proper amount of change is dispensed through the coin dispenser 28.

The currency changer device 14 also includes a bill accepter 30 carried by the housing 18 for accepting and sorting a plurality of bills in bulk. In other words, the bill accepter 30 allows a user to deposit a plurality of unsorted bills into the currency changer device 14 in a cash transaction. After the plurality of unsorted bills are deposited into the bill accepter 30, the plurality of unsorted bills are sorted and routed to a plurality of bill cassettes 32 carried by the housing 18 in communication with the bill accepter 30. The plurality of bill cassettes 32 are adapted to receive a respective plurality of similar denomination bills from the bill accepter 30. The bill cassettes 32 may include a plurality of bill cassettes for receiving different denomination bills that have been sorted. More particularly, the bill cassettes may include a $1 bill cassette 32*a* for receiving $1 bills, a $5 bill cassette 32*b* for receiving $5 bills, a $10 bill cassette 32*c* for receiving $10 bills, and a $20 bill cassette 32*d* for receiving $20 bills.

Those skilled in the art will appreciate that the currency changer device 14 may also be adapted to receive $50 bills and $100 bills. These bills may, for example, be stacked in separate cassettes. It is preferable, however, that these denomination bills are not dispensed to users. Accordingly, security of cash stored within the currency changer device 14 is advantageously enhanced. Those skilled in the art will further appreciate that the currency changer device 14 is illustrated as having four bill cassettes, but may also include any number of bill cassettes for accepting any denomination bills, and any type of bills, i.e., U.S. bills and foreign bills.

The currency changer device 14 also includes a bill dispenser 34 in communication with each of the plurality of bill cassettes 32 and carried by the housing 18. The bill dispenser 34 dispenses a plurality of bills in response to the point of sale terminal. In other words, and similar to the process of accepting and dispensing coins described above, the point of sale terminal 12 determines the cost of merchandise, and the amount of change due in a cash transaction depending on the amount of cash deposited by a user. Upon a determination by the point of sale terminal 12 of the amount of change due to a user, the proper number of bills from each denomination may be dispensed from the bill cassettes through the bill dispenser 34.

Therefore, the currency changer device 14 of the drawerless point of sale terminal 10 of the present invention advantageously prevents access to cash by a user. This is advantageous for any type of user in any type of point of sale retail management system. In other words, the drawerless point of sale terminal 10 may advantageously be used in situations where an attendance is checking out goods, or it may also be used in a situation such as self-checkout. In any type of situation where a cash transaction is involved, the drawerless point of sale terminal 10 of the present invention advantageously prevents access to the cash held by the currency changer device 14.

Referring now additionally to FIGS. 2-6, additional aspects of the drawerless point of sale terminal 10 according to the present invention are now described in greater detail. More specifically, and as described above, a communications link 16 extends between the currency changer device 14 and the point of sale terminals 12. The communications link 16 advantageously allows the currency changer device 14 to communicate with the point of sale terminal 12. For example, the point of sale terminal 12 provides a signal to activate the currency changer device 14 upon a determination that cash will be used to process the sales transaction. Further, the communications link 16 is also used to provide data from the point of sale terminal 12 to the currency changer device 14. The data may, for example, include a predetermined amount of cash required to be tendered for a cash transaction and a predetermined amount of cash required to be dispensed to a user as change in the cash transaction.

Figure 6:
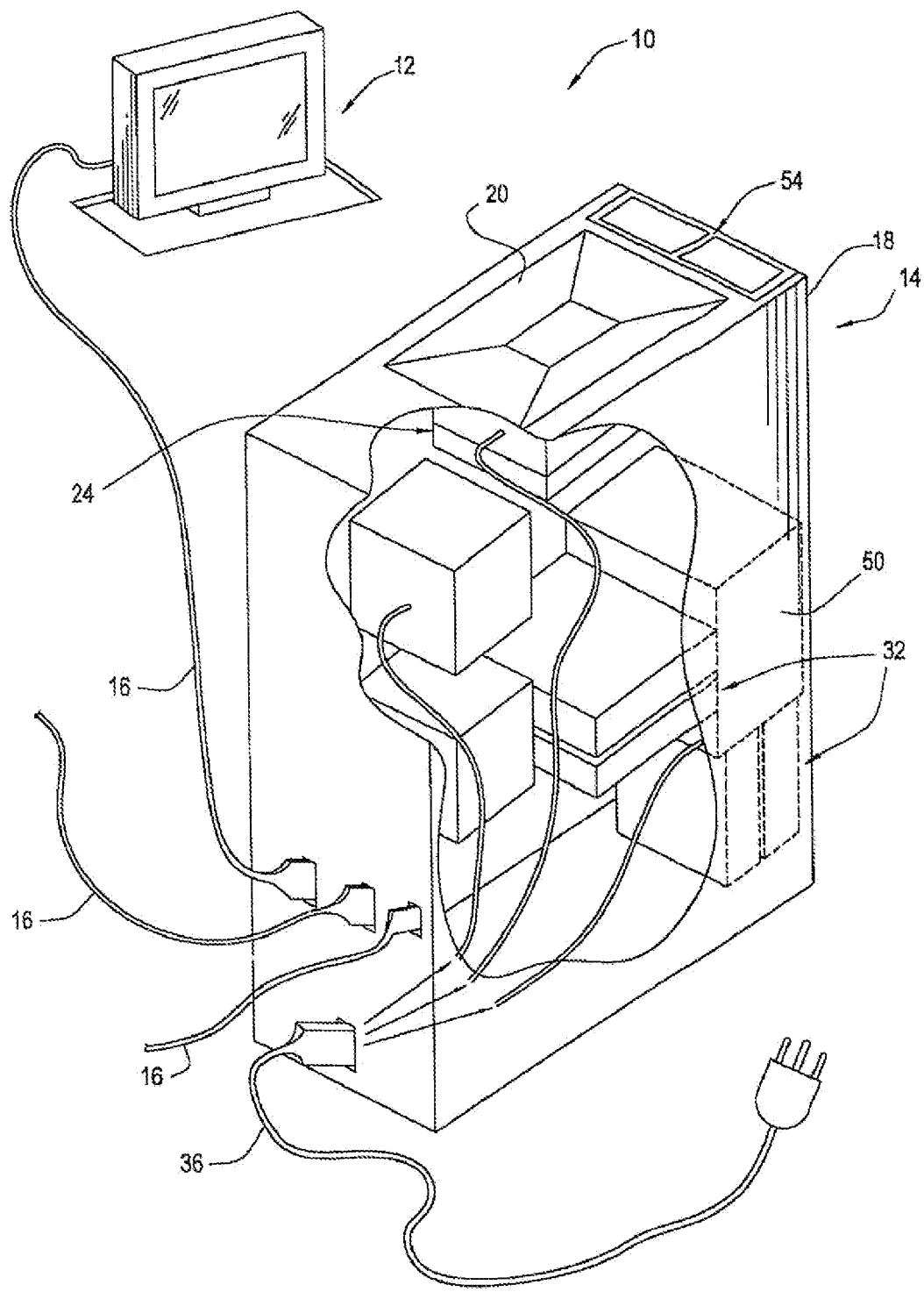
FIG. 6 is a perspective view of the currency changer device of the drawerless point of sale terminal illustrated in FIG. 1 and showing data connections between the currency changer device and the point of sale terminal.

Referring now more specifically to FIG. 6, a power supply 36 for the currency changer device 14 is now described in greater detail. The power supply 36 may be provided, for example, by either an AC power supply, i.e., plugged into a standard outlet, or a DC power supply, i.e., a self-contained power supply carried by the housing 18. Although the power supply 36 is illustrated in FIG. 6 as an AC power supply to be plugged into a wall, those having skill in the art will appreciate that the currency changer device 14 may include a self-contained power supply. Further, a plurality of power supplies 36 may be carried by the housing 18 to provide power to various components of the currency changer device 14. For example, a first power supply 36*a* may be provided to supply power to the coin sorter, coin dispenser, bill accepter, bill dispenser, and bill cassettes. The second power supply 36*b* may be used to supply power to the coin accepter. The third power supply 36*c* may be used to supply power to the communications router 38 carried by the housing 18 and in communication with the communications link 16 to the point of sale terminal 12.

Figure 3:
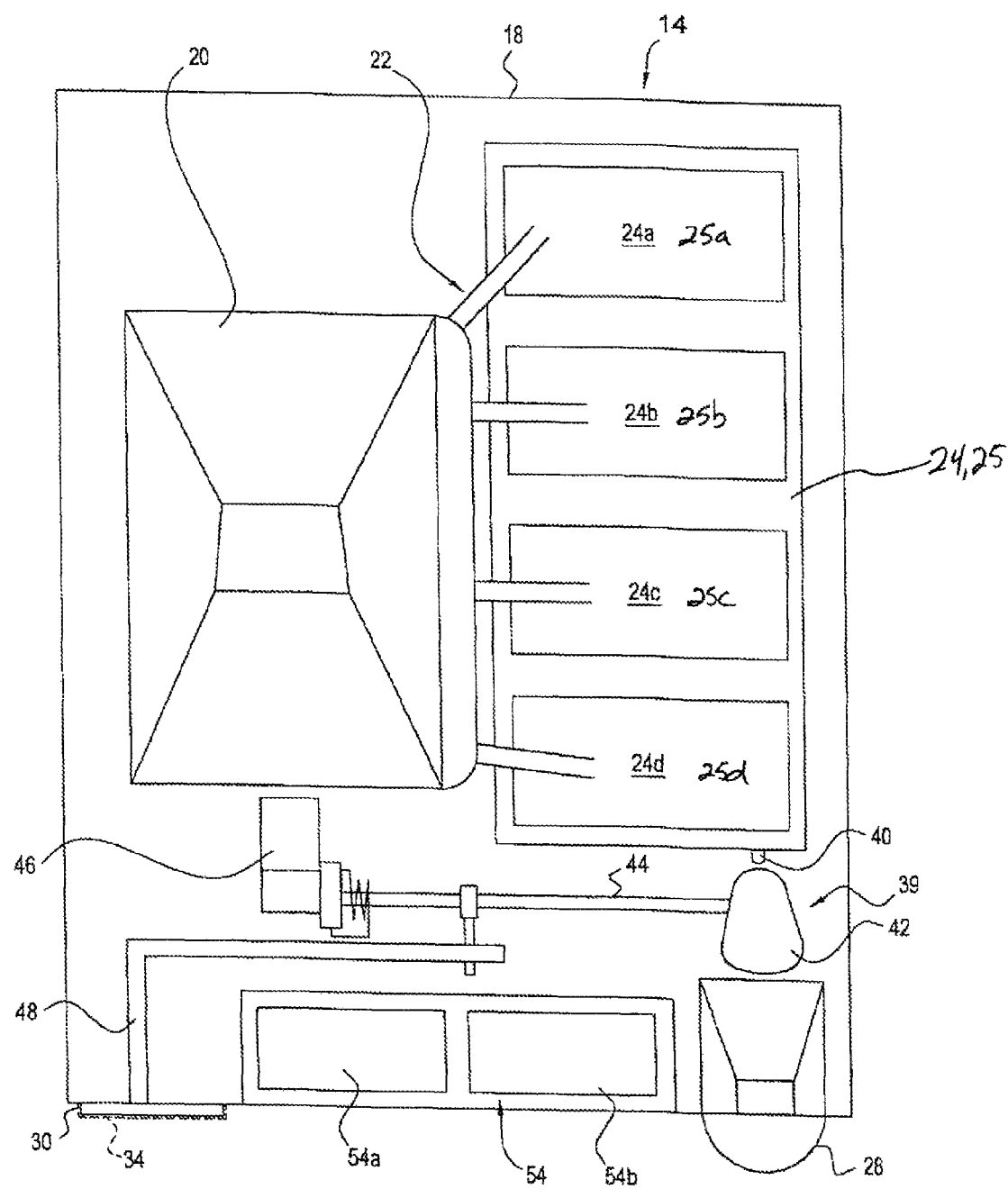
FIG. 3 is a schematic view of the currency changer device shown in FIG. 1 illustrating the function of the coin accepter, sorter and dispenser.

Referring now more specifically to FIG. 3, additional details of the coin accepting, sorting, and dispensing process are provided in greater detail. More specifically, as previously discussed above, the currency changer device 14 includes a coin accepting tray 20. The coin accepting tray 20 is illustratively provided by a hopper to allow a user to drop unsorted coins therein. The coin accepting tray 20 is in communication with a coin sorter 22 provided by a plurality of rails. The coin sorter 22 routes sorted coins to the coin bins 24.

Accordingly, similar denomination coins are positioned in the similar denomination coin bins 24*a*-24*d*. The coin bins are in communication with an internal coin dispenser 40. More specifically, the internal coin dispenser 40 is preferably characterized as an outlet for coins to be dispensed from the individual coin bins 24*a*-24*d*. The internal coin dispenser 40 is in communication with an internal coin cup 42. The internal coin cup 42 receives coins dispensed from the internal coin dispenser 40. The internal coin cup 42 is connected to a coin cup shaft 44 that allows for lifting and rotation of the internal coin cup to thereby dispense the coins into the cup of the coin dispenser 28 that is carried by the housing 18 of the currency changer device 14. More specifically, the coin cup shaft 44 is connected to a coin cup access pin which is positioned in communication with a linear actuator servo motor 46. A coin cup rotation initiation bar 48 is positioned to start the rotation of the coin cup shaft 44 until a linear actuator hits a top limit sensor and reverses direction to move back to an originating home position. Accordingly, as coins are dispensed from the internal coin dispenser 40 to the internal coin cup 42, the internal coin cup may be rotated to allow for the coins in the internal coin cup to be dispensed into the coin dispenser 28.

Figure 4:
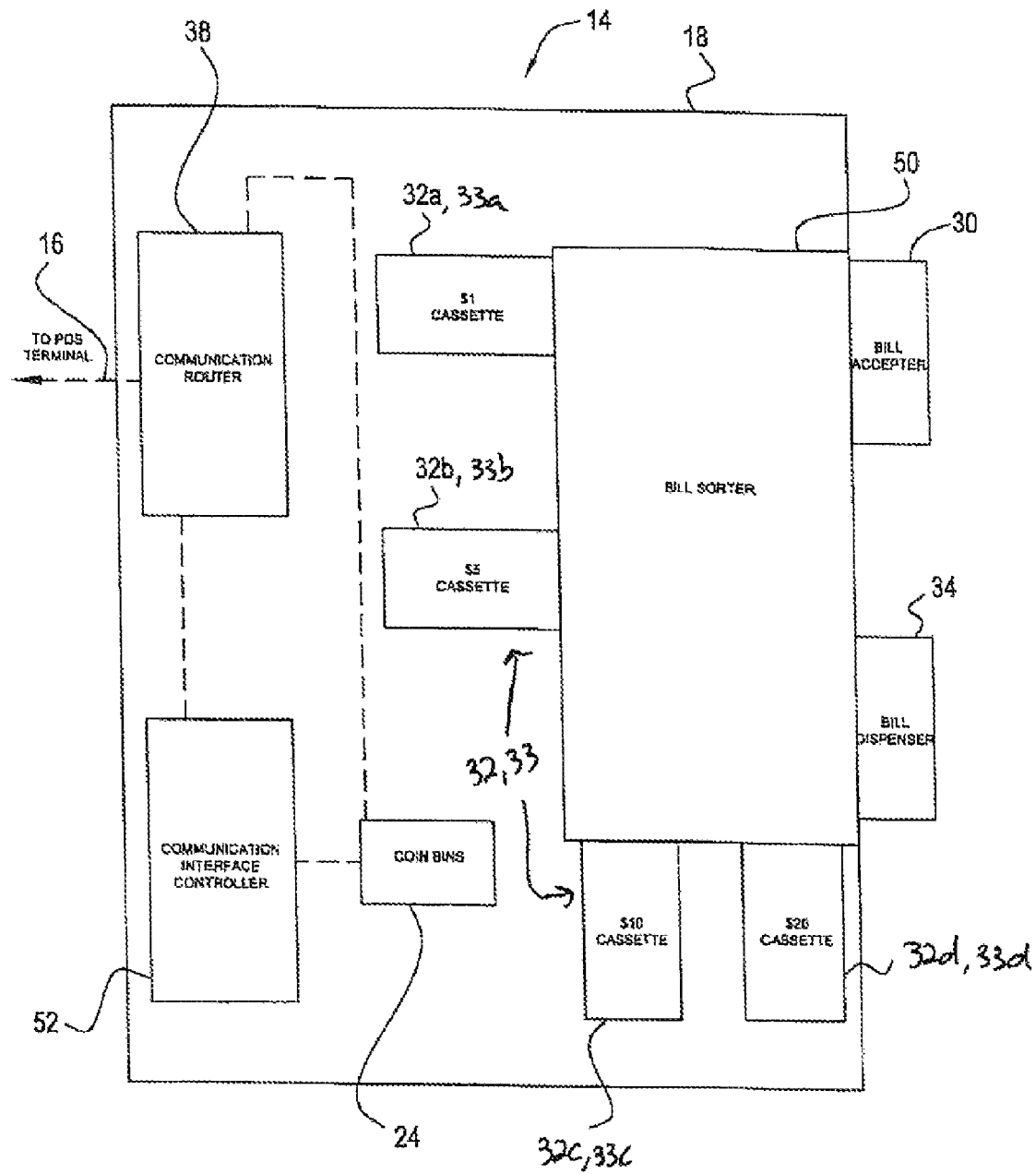
FIG. 4 is a schematic view of the currency changer device shown in FIG. 1 illustrating the function of the bill accepter, sorter and dispenser, and the communication therebetween.

Referring now more specifically to FIG. 4, additional details of the process of accepting and dispensing bills in the currency changer device 14 are now described in greater detail. As illustrated, the currency changer device 14 includes a bill accepter 30 and a bill dispenser 34. The bill accepter 30 is in communication with a bill sorter 50. Upon insertion of a plurality of bills, i.e., bank notes, in bulk, into the bill accepter 30, the plurality of bills are sorted in the bill sorter 50. More specifically, the plurality of bills are sorted and positioned in bill cassettes 32.

As illustrated, the bill cassettes 32 may include four separate bill cassettes 32*a*, 32*b*, 32*c*, 32*d*. As described above, the cassettes may be adapted to receive any type of currency, but when used for a cash transaction in the U.S., the bill cassettes are preferably adapted as a $1 bill cassette 32*a*, a $5 bill cassette 32*b*, a $10 bill cassette 32*c*, and a $20 bill cassette 32d. As also mentioned above, those having skill in the art will appreciate that the bill cassettes 32 may also advantageously include a $50 bill cassette and a $100 bill cassette (not shown), that are used to collect $50 bills and $100 bills, but adapted to prevent the $50 bills and the $100 bills from being dispensed.

The currency changer device 14 may also include a communications router 38. The communications router 38 is preferably in communication with the coin bins 24. More specifically, the communications router 38 is in communication with the communications link 16 to position the components of the currency changer device 14 in communication with the point of sale terminal 12. The currency changer device 14 also illustratively includes the communications interface controller 52 positioned in communication with the communications router 38. The communications interface controller 52 preferably obtains power from a power supply 36b, and a communications link exists between the communications interface controller 52 and all of the coin bins 24a-24d. In more simple terms, the communications link 16 between the point of sale terminal 12 and the currency changer device 14 uses communications protocol commands to command the currency changer device to perform various tasks, e.g., accept currency and dispense currency as change in a cash transaction.

Figure 2:
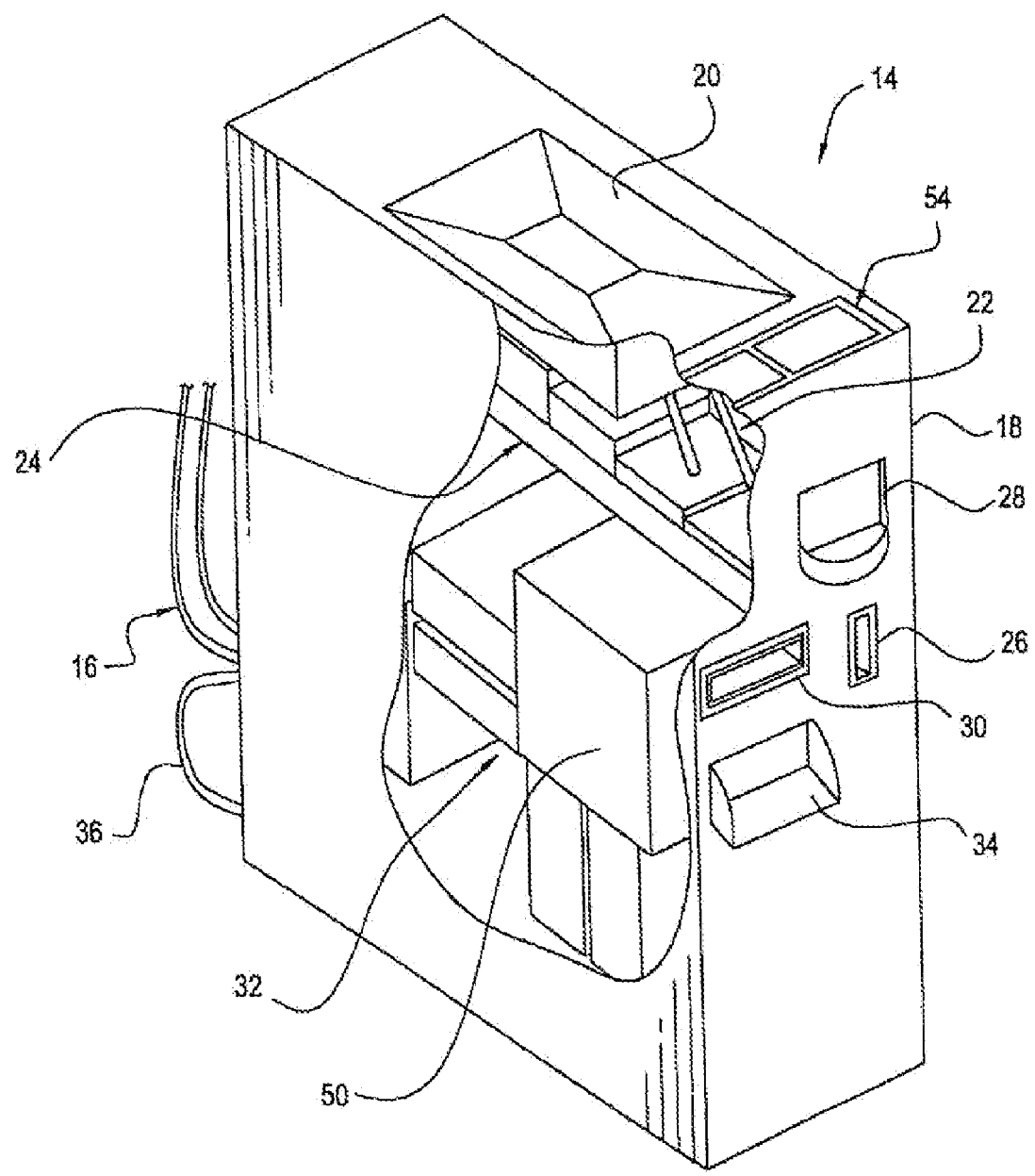
FIG. 2 is a perspective view of a currency changer device of the drawerless point of sale terminal shown in FIG. 1 having portions cut away.

As perhaps best illustrated in FIGS. 1-3, the currency changer device 14 also includes an indicator light 54 to provide an indication to a user that the currency changer device 14 is ready to accept currency. The indicator light 54 is preferably positioned adjacent a top surface 18 of the housing. Accordingly, the indicator light 54 may be readily visible by a user standing over the currency changer device 14.

The indicator light 54 may include a plurality of lights for providing a plurality of indications to a user. For example, a first light may be a red light indicating that the currency changer device 14 is not ready to receive currency, and a second light may be a green light indicating that the currency changer device 14 is ready to accept currency. Those skilled in the art will appreciate that any combination of indicator lights may be used to achieve the objects, features and advantages of the present invention.

The drawerless point of sale terminal may advantageously include a respective plurality of pressure pads (not shown) positioned on the floor adjacent the currency changer device 14. The plurality of pressure pads may be positioned in communication with the currency changer device 14. The plurality of pressure pads sense the presence of a user, such as an attendant at a point of sale terminal 12 or a user of a self checkout system. Accordingly, the pressure pads advantageously prevent the possibility of out-of-line cash insertion scenario. This mechanism prevents untrained attendants to make possible mistakes.

Figure 5:
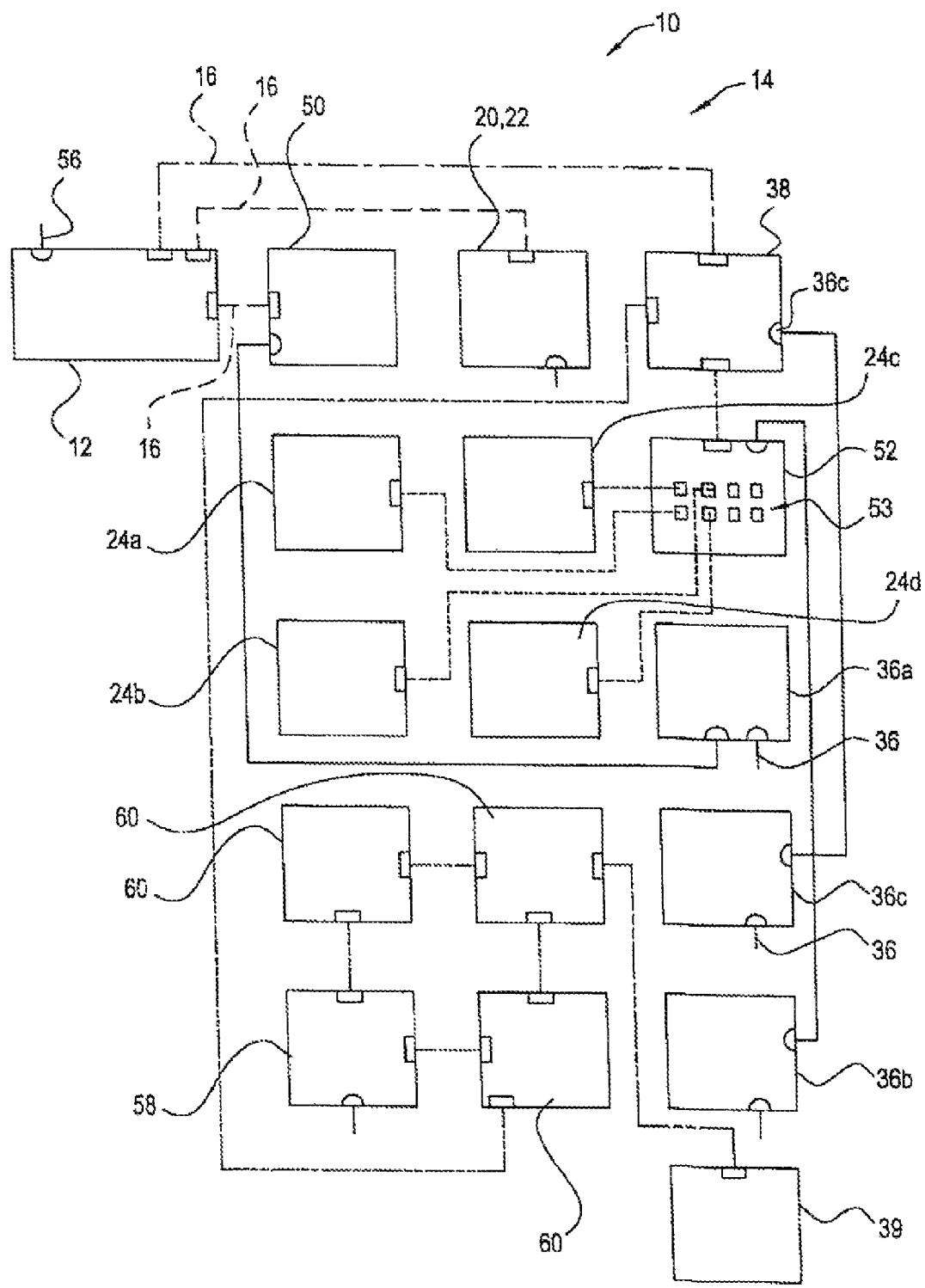
FIG. 5 is an electrical schematic showing communication between the components of the currency changer device illustrated in FIG. 1.

Referring now more specifically to FIG. 5, the electrical layout of the components of the drawerless point of sale terminal 10 are now described in greater detail. The point of sale terminal 12 may include a power supply 56 to provide power thereto. The power supply 56 for the point of sale terminal 12 is preferably an AC power connection. Those skilled in the art, however, will appreciate that any other type of power supply may be used to provide power to the point of sale terminal 12.

The point of sale terminal 12 is connected to the currency charger device 14. As illustrated, a plurality of communications links 16 send information between the point of sale terminal 12 and the currency changer device 14. More particularly, a USB interface may be positioned to extend between the point of sale terminal 12 and the communications router 38 carried by the housing 18 of the currency changer device 14. This USB interface link 16 is preferably used to provide commands to the coin dispenser. Further, an RS 232 currency management interface link 16 may be positioned to extend between the point of sale terminal 12 and the coin accepter/sorter 20 Another RS 232 interface 16 may extend from the point of sale terminal 12 to the bill sorter 50.

A communications interface controller 52 is positioned in communication with the communications router 38 using another interface link. The interface link between the communications router 38 and the communications interface controller 52 is preferably a CCTALK interface link. The communications interface controller 52 is also preferably positioned in communication with each of the coin bins 24a-24d via CCTALK interface links. More specifically, the communications interface controller 52 may be a CCTALK splitter 53 to provide the CCTALK connection between the communications interface controller 52 and the coin bins 24a-24d. Accordingly, the interconnections between the various devices are used to control operation of the coin dispensing features of the present invention.

The housing 18 of the currency changer device 14 also includes an AC power supply 36 connected to a paylink communications power supply, i.e., the communications router power supply 36c. The AC power supply 36 may be connected to the coin dispenser 28 and also to the communications router at the communications router power supply 36c. The system 10 of the present invention contemplates the use of software to control the operation of the currency changer device 14. More specifically, and as perhaps best illustrated in FIGS. 2-3, coins may be initially accepted and sorted by coin accepter 20 and the coin sorter 22. The coins may then be routed mechanically to the individual coin bins 24a-24d via the coin routing system 22. Software is preferably used to keep track of the quantity and denomination of coins deposited and keeps a running tally of the total number of coins in each coin bin. The power supply 36b for the coin bins 24a-24d is preferably in communication with the communications interface controller 52.

The currency changer device 14 also includes a motion controller module 58 and a plurality of motion controller relays 60. The motion controller module 58 and motion controller relays 60 are in communication with the communications router 38 and the coin lift mechanism 39. As discussed above, the coin lift mechanism 39 includes the internal coin cup 42, the coin cup shaft 44, the servo motor 46, and the coin cup rotation initiation bar 48 to tilt the internal coin cup so the coins are spilled into the external coin cup 28 to dispense coins. The motion controller relays 60 are positioned in communication with the communications router using a control logic link.

FIG. 6 illustrates the drawerless point of sale terminal 10 and the links between the point of sale terminal 12 and the currency changer device 14. The communications links between the point of sale terminal 12 and the currency changer device 14, as well as the power supplies 36 to the currency changer device 14 have been discussed in greater detail above.

As discussed above, the drawerless point of sale terminal 10 is preferably self-replenishing. In other words, as a user inserts currency into the currency changer device 14, the currency self replenishes in the coin bins 24 and the bill cassettes 32. Those skilled in the art will appreciate, however, that the currency changer device 14 will need to be initially stocked with currency. Further, there may be instances when a particular denomination of currency may run short. For example, the currency changer device 14 may run out of $1 bills being held in the $1 bill cassette 32a. Accordingly, an indication may be provided at the point of sale terminal 12 that the $1 bills need to be replenished. In a case when the currency changer device 14 is connected to a pair of point of sale terminals 12, as illustrated, for example, in FIG. 1, an indication needs to be provided to a user when the currency changer device 14 is ready to accept cash for their particular transaction.

For example, the point of sale terminals 12 may include a left side point of sale terminal and a right side point of sale terminal. When the currency changer device 14 is ready to receive currency from the left side point of sale terminal, for example, an indication may be provided on the point of sale terminal 12 so that the user is informed as to the status of the currency changer device. This indication is also advantageously enhanced using the indicator light 54 on the currency changer device. In other words, the indicator light 54 may provide another indication to the user that the currency changer device is ready to accept currency.

The indicator light 54 may, for example, be provided by a light emitting diode. More particularly, and as perhaps best illustrated in FIG. 3, the indicator light 54 may include a pair of indicator lights. The pair of indicator lights 54 may be used to provide indications to the respective pair of point of sale terminals 12 that are connected to the currency changer device 14. Therefore, a left side indicator light 54a may be used to provide an indication to a left side point of sale terminal, and a right side indicator light 54b may be used to provide an indication to the right side point of sale terminal.

The indicator light 54 may be adapted to provide different types of indications. For example, the indicator light may be illuminated red, for example, after the currency changer device 14 has been activated, but is not yet ready to accept currency. Further, the indicator light 54 may be illuminated green in a case where the currency changer device 14 is ready to accept currency. In a case where currency has been deposited into the currency changer device 14, and the currency changer device is busy, the indicator light 54 may be illuminated yellow. Those having skill in the art will appreciate that the indicator light 54 may be illuminated using a constant illumination, may be a flashing illumination, or any combination thereof.

Those having skill in the art will appreciate that the drawerless point of sale terminal 10 may also include a manual mode. In other words, the point of sale terminals 12 may, for example, include a cash drawer that may only be opened should the currency changer device 14 fail to properly operate. Of course, the manual mode would only be available for systems that use an attendant. In other words, there would be no accessibility to a cash drawer in a self check out system.

Figure 7:
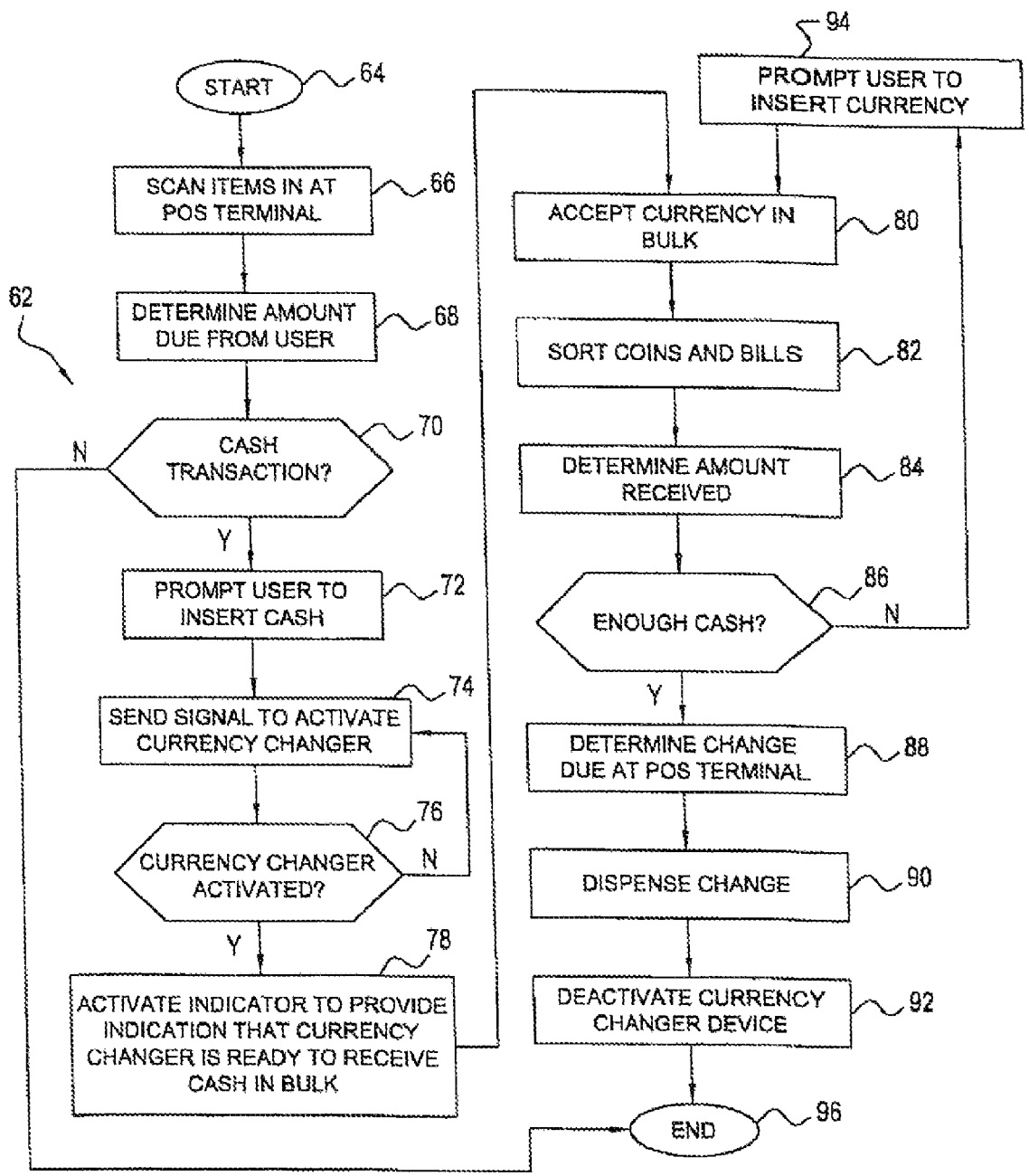
FIG. 7 is a flow chart describing a method of using a drawerless point of sale terminal according to the present invention.

Referring now additionally to the flow chart 62 of FIG. 7, a method aspect of the present invention is now described in greater detail. From the start (block 64), items are scanned in at the point of sale terminal 12 at block 66. At block 68, the amount due from the user is determined. At block 70, it is determined whether or not the transaction is a cash transaction. If it is determined that the transaction is not a cash transaction at block 70, then the method is ended at block 96. If, however, it is determined that the transaction is a cash transaction at block 70, then the user is prompted to insert cash at block 72.

At block 74, a signal is sent from the point of sale terminal 12 to the currency changer device 14 to activate the currency changer device. At block 76, it is determined whether the currency changer device is activated. If it is determined at block 76 that the currency changer device has not been activated, then the signal to activate the currency changer device is again sent at block 74. If, however, it is determined at block 76 that the currency changer device 14 has been activated, then the indicator light 54 is activated to provide an indication that the currency changer device 14 is ready to receive cash in bulk at block 78.

At block 80, currency is accepted in bulk. In other words, a plurality of unsorted coins and a plurality of unsorted bills are accepted into the currency changer device 14 in bulk. Therefore, there advantageously is no need for a user to separate in individually insert currency. Instead, the user may insert a plurality of unsorted currency simultaneously. Further, it is not necessary for a user to insert currency in any particular order. In other words, the user of the system 10 of the present invention may insert coins before bills, bills before coins, or bills and coins simultaneously.

At block 82, the currency that is deposited into the currency changer device 14 is sorted. More particularly, the coins and bills are sorted simultaneously. Therefore, those skilled in the art will appreciate that there is no priority to sorting coins over bills or bills over coins. The coins and bills are sorted simultaneously.

At block 84, the amount of currency inserted by the user is determined. At block 86, it is determined whether enough currency was deposited by the user. If it is determined at block 86 that enough currency was not deposited by the user, then the user is prompted to insert additional currency at block 94. Thereafter, currency is accepted in bulk at block 80, the currency is sorted at block 82, and it is again determined whether or not enough currency was received at block 86.

If it is determined at block 86 that enough currency was deposited into the currency changer device 14 by the user, then the amount of change due to the user, if applicable, is determined at the point of sale terminal 12 at block 88. At block 90, the change is dispensed by the currency changer device 14 to the user. The currency changer device is deactivated at block 92, and the method is ended at block 96.

Figure 8:
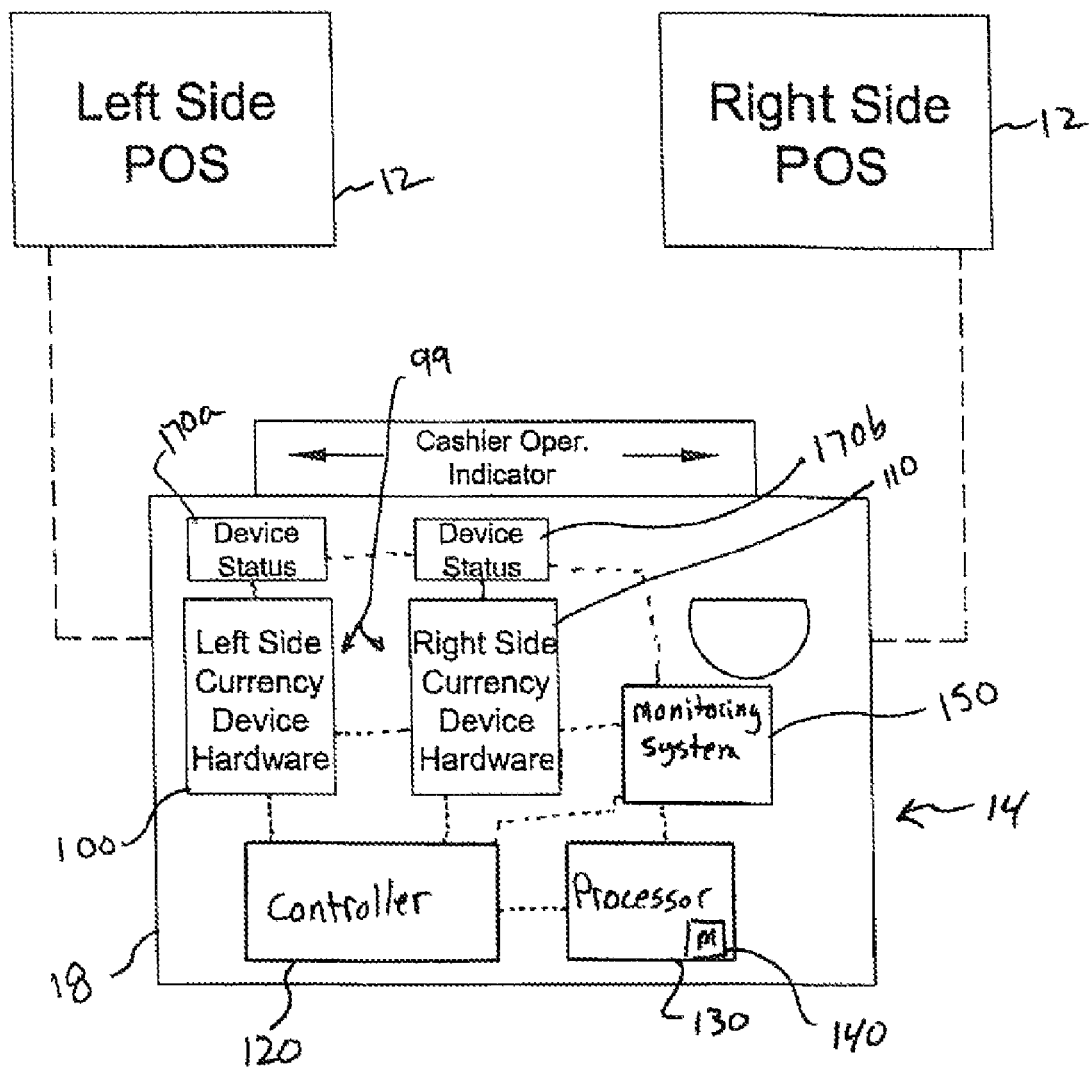
FIG. 8 is a schematic diagram of a currency changer device according to the present invention.
Figure 9:
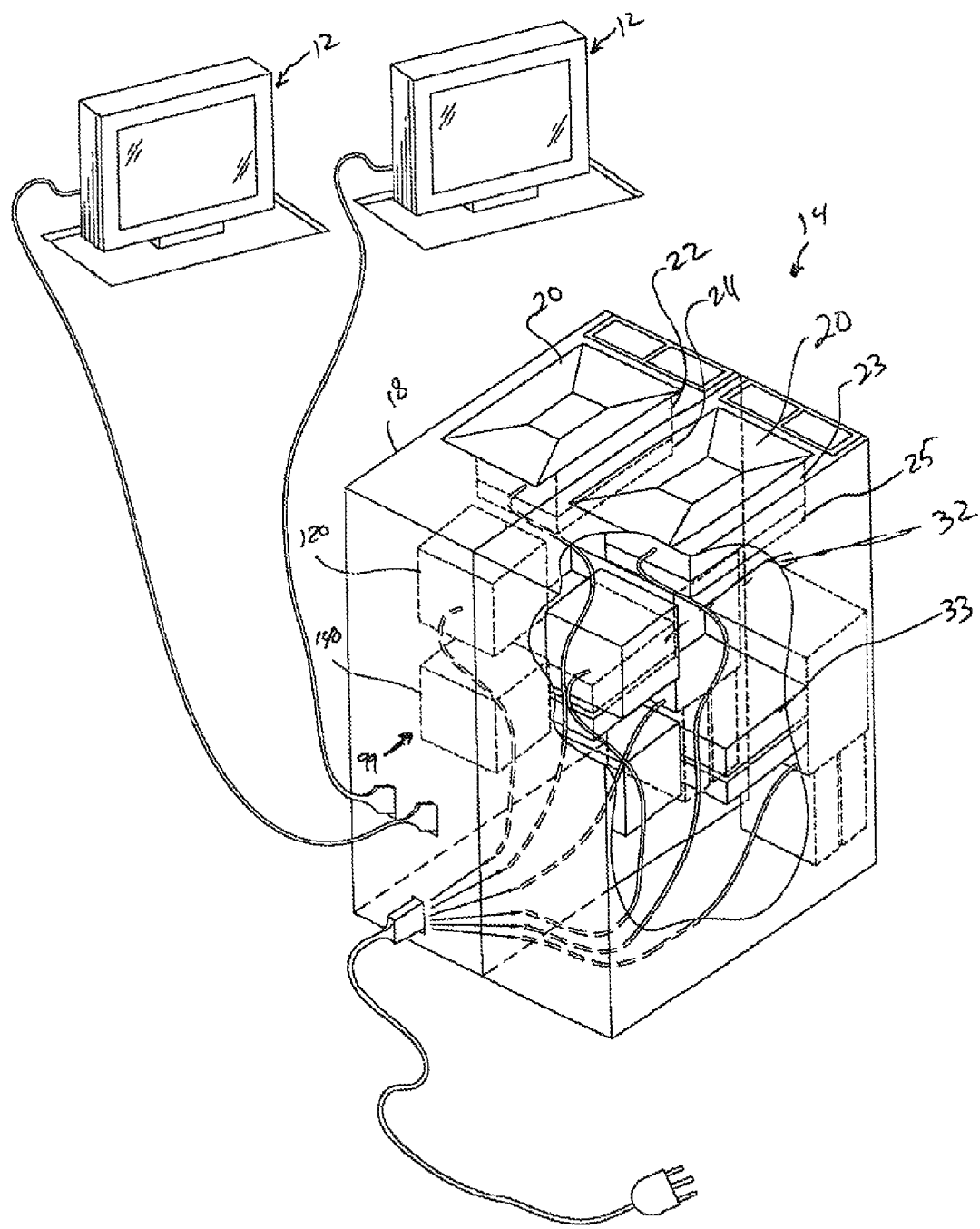
FIG. 9 is a perspective view of a currency changer device according to the present invention connected to a pair of point of sale terminals and showing a plurality of first and second currency changer device hardware components positioned in a redundant fashion.

Referring now additionally to FIGS. 8-11, additional features of the currency changer device 14 according to the present invention are now described in greater detail. Referring specifically to FIGS. 8 and 9, a redundancy and "hot swappable" feature of the currency changer device 14 according to the present invention is now described in greater detail. This feature is especially advantageous to ensure that use of the currency changer device 14 according to the present invention is not interrupted. More specifically, the currency changer device 14 according to the present invention includes a housing 18, a coin accepting tray 20 carried by the housing for accepting a plurality of unsorted coins in bulk, and a bill accepter 30 carried by the housing for accepting a plurality of unsorted bills in bulk. As discussed above, the currency changer device 14 according to the present invention advantageously allows for a plurality of unsorted coins and unsorted bills to be readily deposited when engaging in a cash transaction. In other words, a user may simply drop a plurality of different denomination coins into the coin accepting tray 20 and deposit a plurality of different denomination bills into the bill accepter 30 in order to pay for a cash transaction.

The currency changer device 14 includes a plurality of currency changer device hardware components 99 carried by the housing 18. To achieve the redundancy and "hot swappable" features of the present invention, the currency changer device hardware components 99 include a plurality of first currency changer device hardware components 100 and a plurality of second currency changer device hardware components 110. The pluralities of first and second currency changer hardware components 100, 110 are each carried by the housing 18. Further, the respective plurality of second currency changer device hardware components 110 are identical to the respective plurality of first currency changer device hardware components 110. In other words, every hardware component contained within the housing 18 of the currency changer device 14 that is associated with accepting and dispensing currency is duplicated. The duplication of each of the hardware components advantageously provides a backup of each hardware component to ensure the currency changer device 14 according to the present invention continues to operate without interruption in the case of a malfunction or failure of a hardware component. This feature of the currency changer device 14 according to the present invention also advantageously allows for the malfunctioning or failed hardware component to be readily changed or maintained while the currency changer devices continues to operate without interruption. In other words, the currency changer device hardware component that has malfunctioned or failed may be replaced with a new currency changer device hardware component while operation of the currency changer device 14 according to the present invention continues without interruption.

Each of the first and second plurality currency changer device hardware components 100, 110 includes a first and a second coin sorter 22, 23 each in communication with the coin accepting tray 20. As discussed above, the coin sorters 22, 23 are adapted to sort the unsorted coins that are deposited in bulk into the coin accepting tray 20. Each of the first and second plurality of currency changer device hardware components 100, 110 also include a first and a second plurality of respective coin bins 24, 25 in communication with the respective first and second coin sorters 22, 23 for receiving a respective plurality of similar coins. In other words, after the plurality of unsorted coins that have been deposited in bulk into the coin accepting tray 20 are sorted using one of the first and second coin sorters 22, 23, the sorted coins are deposited into the first and second plurality of respective coin bins 24, 25.

The currency changer device hardware components 99 also include a first and a second plurality of bill cassettes 32, 33 in communication with the bill accepter 30. The bill accepter 30 is adapted to receive and sort the plurality of unsorted bills that are deposited therein, and the plurality of bill cassettes 32, 33 are adapted to receive and dispensing a respective plurality of similar bills. More specifically, the bill accepter 30 may accept a plurality of unsorted bills that are deposited therein in bulk, i.e., a user may deposit several different bills each having a different denomination at one time. This advantageously saves time for users as it allows users to deposit several bills at one time, instead of depositing each bill individually. Upon insertion of the unsorted bills into the bill accepter 30, the denomination of each individual bill is determined. Once the denomination of each individual bill is determined, each individual bill is routed to the proper bill cassette from among the plurality of bill cassettes 32, 33. The currency changer device 14 according to the present invention may route each individual bill to a bill cassette in either one of the first or second plurality of bill cassettes 32, 33.

For example, the currency changer device 14 preferably includes a first and a second $1 bill cassette 32a, 33a, a first and a second $5 bill cassette 32b, 33b, a first and a second $10 bill cassette 32c, 33c, and a first and a second $20 bill cassette 32d, 33d. The present invention contemplates the use of other denomination of bill cassettes as well, i.e., $50 bill cassettes and $100 bill cassettes. Upon determining, for example, that a $1 bill has been deposited into the bill accepter 30, the $1 bill is routed to either the first or the second $1 bill cassette 32a, 33a. This is true for all denominations of bills that may be deposited into the currency changer device 14. After having had the benefit of reading this disclosure, those skilled in the art will appreciate that the first and second plurality of bill cassettes 32, 33 also dispense a plurality of bills in a cash transaction, i.e., as change. As will be discussed in greater detail below, the amount of currency being deposited into each of the first and second bill cassettes 32, 33 may be controlled using a load balancing mechanism to ensure that there is not a disproportionate amount of bills being deposited into the first plurality of bill cassettes 32 or the second plurality of bill cassettes 33.

The currency changer device 14 according to the present invention may also include a coin dispenser 28 carried by the housing 18 and in communication with the first and second plurality of respective coin bins 24, 25. The coin dispenser 28 is adapted to receive and dispense coins from the coin bins. This is typically used when providing change in a cash transaction. The currency changer device according to the present invention also includes a bill dispenser 34 carried by the housing 18 and in communication with the first and the second plurality of bill cassettes 32, 33 to dispense a plurality of bills. Again, and as disclosed above, the bill dispenser 34 is adapted to dispense bills from the bill cassettes 32, 33, which is preferably a function performed when providing change in a cash transaction.

As also discussed in greater detail above, the currency changer device 14 is adapted to accept a plurality of unsorted coins in bulk and a plurality of unsorted bills in bulk for a cash transaction. The currency changer device 14 is also adapted to dispense change in a cash transaction responsive to commands received from the at least one point of sale terminal 12. More specifically, the change may be provided as both coins and bills, and may also be dispensed in bulk. In other words, and with respect to dispensing a plurality of bills as change, the bills are not dispensed to a user one at a time. Instead, a plurality of bills may be withdrawn from the respective plurality of bill cassettes 32, 33 and dispensed all together to the user. As will be discussed in greater detail below, the plurality of bills may be dispensed from any combination of the first or second plurality of bill cassettes 32, 33.

The currency changer device 14 may include a controller 120 in communication with each of the respective plurality of first currency changer device hardware components 100 and second currency changer device hardware components 120. The currency changer device 14 may also include a processor 130 in communication with the controller 120. The processor 130 may include a memory 140 so that software relating to operation of the currency changer device 14 may be stored thereon. The controller 120 provides a link between the processor 130 and the currency changer device hardware components 99 so that the operations relating to the software and operation of the currency changer device 14 may be carried out.

The currency changer device 14 according to the present invention may also include a currency changer device hardware component monitoring system 150 in communication with the controller 120 and each of the respective plurality of first currency changer device hardware components 100 and second currency changer device hardware components 110. The currency changer device hardware component monitoring system 150 is adapted to monitor each of the respective plurality of first currency changer device hardware components 100 and second currency changer device hardware components 110.

Operation of the currency changer device hardware component monitoring system 150 may be carried out in several different ways. For example, the currency changer device hardware component monitoring system 150 may periodically check the health of each of the first and second currency changer device hardware components 100, 110. Such a periodic check may occur, for example, every thirty seconds, but those having skill in the art will appreciate that the periodic check can take place over any given time period. The periodic check may include a signal transmitted to each of the first and second currency changer device hardware components 100, 110, and a response signal transmitted to the controller 120 with an indication as to the health of each of the first and second currency changer device hardware components 100, 110. Alternately, the currency changer device hardware component monitoring system 150 may simply operate based on waiting for receipt of a malfunction signal from one of the currency changer device hardware components 100, 110 and, in the absence of receipt of a malfunction signal, assume that each of the currency changer device hardware components are operating in a healthy manner.

Upon determining that any one of the currency changer device hardware components 100, 110 has either malfunctioned or failed, a series of steps may be taken. An immediate step that occurs upon detection of a malfunctioned or failed currency changer device hardware component is that the currency changer device hardware component that has been identified as either malfunctioning or failing may be deactivated. This advantageously prevents any further failures that may be associated with trying to use a currency changer device hardware component that is malfunctioning or that has failed. In a simultaneous or almost simultaneous manner, currency may be rerouted to a backup currency changer device hardware component. The backup currency changer device hardware component is identical to the currency changer device hardware component that has either failed or malfunctioned, and carries out a similar function. In other words, if it is determined that the first $1 bill cassette 32*a* has failed, then all further $1 bills are immediately rerouted to the second $1 bill cassette 33*a* and all requests to dispense $1 bills are rerouted to the second $1 bill cassette. This advantageously allows for the currency changer device 14 according to the present invention to continue to operate without interruption.

Another aspect of the currency changer device hardware component monitoring system 14 is that upon detection of a currency changer device hardware component that has failed or malfunctioned, a malfunction signal may be transmitted from the controller 120 to a predetermined location. The controller 120, for example, may be in communication with a global communications network 160, e.g. the internet. Accordingly, the malfunction signal may be transmitted to, for example, a maintenance center, so that the currency changer device hardware component that has malfunctioned or failed can be repaired or replaced as necessary.

The currency changer device 14 according to the present invention advantageously allows for the currency changer device hardware component that has malfunctioned or failed to be repaired or replaced without interruption in service to the currency changer device. This feature is referred to as a "hot swappable" feature. The "hot swappable" feature of the currency changer device 14 may be readily carried out because the currency changer device hardware component that has been identified as malfunctioning or that has failed is deactivated while currency is automatically rerouted to the backup currency changer device hardware component. Accordingly, upon deactivation of the malfunctioning currency changer device hardware component or the currency changer device hardware component that has failed, maintenance or replacement thereof can be readily carried out while the currency changer device 14 continues to operate without interruption. After having had the benefit of this disclosure, those skilled in the art will appreciate that it is preferable for the currency changer device hardware component that has been identified as malfunctioning or that has failed to simply replaced with a functioning currency changer device hardware component. The removed currency changer device hardware component may then be repaired and reused in another currency changer device, for example. This advantageously allows for the currency changer device 14 to be readily placed back into a fully functioning condition, and also allows for a more suitable environment for the malfunctioning currency changer device hardware component, or the currency changer device hardware component that has failed to be repaired.

Referring specifically to FIG. 8, upon receiving an indication that one of the plurality of currency changer device hardware components 99 has malfunctioned or failed, an indication may be provided of the malfunction or failure using a first or second device status member 170*a*, 170*b* carried by the housing 18. The indication may, for example, be a visual indication. This visual indication may, for example, be a flashing light carried by the first or second device status member 170*a*, 170*b*. Those skilled in the art, after having had the benefit of reading this disclosure, will also appreciate that an audible indication may also be provided upon receiving an indication that one of the plurality of currency changer device hardware components has malfunctioned or failed. The audible indication may be provided using a speaker carried by the first or second device status member 170*a*, 170*b*, and may be provided in addition to or in lieu of a visual indication, if so desired.

The skilled artisan will also appreciate that any combination of hardware components from the first and second currency changer device hardware components 100, 110 may be used in combination as necessary. For example, unsorted coins may be inserted in bulk into the coin accepting tray 14 and may be routed to the coin bins 24 associated with the first plurality of currency changer device hardware components 100, while unsorted bills may be deposited in bulk at the bill accepter 30 and may be sorted and routed to the bill cassettes 33 associated with the second currency changer device hardware components 110. Those skilled in the art will further appreciate that currency may also be dispensed in much the same way, i.e., currency may be dispensed from coin bins 25 associated with the second currency changer device hardware components 110 while bills may be dispensed form the bill cassettes 32 associated with the first plurality of currency changer device hardware components 100. Any combination of the above referenced components may be used to accomplish the goals, features, objects and advantages of the currency changer device according to the present invention.

As briefly discussed above, currency may advantageously be deposited into either the coin bins 24 and bill cassettes 32 associated with the first currency changer device hardware components 100 or the coin bins 25 and bill cassettes 33 associated with the second currency changer device hardware components 110. As illustrated, for example, in FIG. 8, the currency changer device 14 includes that which is labeled as left side currency changer device hardware and right side currency changer device hardware. Those skilled in the art will appreciate that it is irrelevant which side the first currency changer device hardware components 100 are positioned on and which side the second currency changer device hardware components 110 are positioned on. In other words, currency changer device hardware components that are physically positioned adjacent a right side of the housing may very well accept currency and dispense currency relating to transactions that take place using the left side point of sale terminal, and vice-versa.

As also illustrated in FIG. 8, the currency changer device 14 is adapted to be used in connection with more than one point of sale terminal 12. In the illustrated example, the currency changer device 14 is positioned in communication with two point of sale terminals 12. Although the left side currency changer device hardware is positioned adjacent the left side point of sale terminal, and the right side currency changer device hardware is positioned adjacent the right side point of sale terminal, the left side currency changer device hardware may be used to accept currency and dispense currency relating to a cash transaction associated with either the left side or right side point of sale terminal. Similarly, the right side currency changer device hardware components may be used to accept currency and dispense currency in a cash transaction associated with either the left side or right side point of sale terminal. The currency changer device 14 according to the present invention also contemplates that both the left side currency changer device hardware components and the right side currency changer device hardware components may be used to accept currency and dispense currency associated with a cash transaction from one point of sale terminal. In other words, coins associated from a cash transaction initiated using the left side point of sale terminal may be deposited into coin bins associated with both the left side currency changer device hardware components and the right side currency changer device hardware components. Several different examples and scenarios relating to the different combinations in which currency may be deposited into the currency changer device hardware components of the currency changer device 14 according to the present invention are possible as well.

As briefly described above, the currency changer device 14 according to the present invention also advantageously includes a load balancing system in communication with the controller 120. The load balancing system is adapted to balance the amount of currency being deposited into the first currency changer device hardware components 100 with the currency being deposited into and dispensed out of the second currency changer device hardware components 110. This advantageously ensures that one set of currency changer device hardware components are not overworked or underworked, and also advantageously ensures that one set of currency changer device hardware components are not filled to capacity with currency or not filled with enough currency to provide change in a cash transaction. The load balancing system according to the present invention also advantageously ensures that the currency changer device 14 continuously operates regardless of whether one of the bill cassettes or coin bins, for example, is filled to capacity. In such a case, i.e., if the $1 bill cassette 32*a* associated with the first plurality of currency changer device hardware components 100 is filled to capacity, remaining $1 bills that are deposited into the currency changer device 14 may automatically be rerouted to the $1 bill cassette 33*a* associated with the second plurality of currency changer device hardware components 110. FIGS. 3 and 4 provide an illustration of the positioning of the first and second bill cassettes 32, 33 and the first and second coin bins 24, 25.

The load balancing system may advantageously be provided by software that is stored on the memory 140 of the processor 130 and in communication with the controller 120. The software may be programmed to achieve any type of load balancing feature that may be desired. More particularly, the software may monitor the amount of currency being deposited in the first currency changer device hardware components 100 to ensure that a similar amount of currency is being deposited into the second currency changer device hardware components 110. This can be achieved by sending signals to change use back and forth between the first currency changer device hardware components 100 and the second currency changer device hardware components. Similarly, the software of the load balancing system may be programmed to monitor currency that is dispensed from the first and second currency changer device hardware components 100, 110 to ensure that the amount of currency contained within each of the first and second currency changer device hardware components are maintained at substantially similar levels.

As indicated above, the currency changer device 14 is preferably connected to a power supply. The power supply may, for example, be an alternating current power supply. The present invention, however, contemplates the use of an uninterruptible power supply to be used along with the power supply. This advantageously enhances reliability of the currency changer device 14.

Operation of the currency changer device 14 according to the present invention is now described. The currency changer device 14 may be initiated to power up. Upon powering up, the controller 120 may send a health status request signal to each of the currency changer device hardware components 99. This signal is sent to all currency changer device hardware components 99 contained within the housing to determine if the currency changer device hardware components are fully functional. Accordingly, in cases where the currency changer device 14 includes a first plurality of currency changer device hardware components 100 and a second plurality of currency changer device hardware components 110, the health status request signal is sent to all components. Of course, in the case where the redundancy feature is installed on the currency changer device 14, the power up and health status request signal is sent to every component in the first and second plurality of currency changer device hardware components 100, 110. Upon receiving response signals from the components, the currency changer device is placed in either a steady state single mode or, in the alternative, in a steady state dual mode. The steady state dual mode is directed to an embodiment of the currency changer device 14 wherein the redundancy features are included, i.e., inclusion of the first and the second plurality of currency changer device hardware components 100, 110. Upon powering up and determining the health status of all currency changer device hardware components, the currency changer device 14 is ready to accept currency or dispense currency, as necessitated by the particular cash transaction.

The currency changer device 14 may operate in at least three different states. These states may, for example, include a idle state, a ready state and a busy state. The idle state may be a state during which the currency changer device 14 has been inactive for a predetermined amount of time. When in the idle state, the currency changer device 14 may power down to conserve energy, thereby making the currency changer device advantageously energy efficient. When it is determined that there is a desire to enter into a cash transaction, the currency changer device 14 may be moved from the idle state to a ready state, i.e., the currency changer device 14 may be positioned in a state wherein it is ready to accept and/or dispense currency in a cash transaction. When the currency changer device 14 is in the middle of a cash transaction, it may be positioned in a busy state. The busy state may prevent the currency changer device from receiving and/or dispensing currency until the cash transaction that is currently being handled is completed. The present invention contemplates, however, that it may be possible for programming features to allow the currency changer device to still engage in multiple transactions simultaneously. The various states in which the currency changer device 14 may operate may be indicated using a visual indication, an audible indication, or either one of these individually or in combination.

There exist several different scenarios that relate to operation of the "hot swappable" feature of the currency changer device 14. As indicated above, an indicator may be provided to show a user the state in which the currency changer device 14 is in, i.e., informing the user that the currency changer device 14 is idle, is ready to engage in a currency transaction, or is busy. In the following scenarios, the terms left side currency changer device hardware components and right side currency changer device hardware components are used. These are for ease of illustration and are to be related to the first and second currency changer device hardware components 100, 110.

For example, in one scenario, the left side currency changer device hardware components may provide an indication that the left side currency changer device hardware components are in the ready state. Upon receiving the indication that the left side currency changer device hardware components are in the ready state, an indication may be provided to a user to begin the cash transaction, i.e., to insert the currency into the currency changer device 14. In this scenario, the right side currency changer device hardware components may provide an indication that the right side currency changer device hardware components are in the idle state. Accordingly, an indication may be provided to the user that the right side currency changer device hardware components are in the idle status. Upon commencing the cash transaction using the left side currency changer device hardware components, a busy indication is provided to the user relating to the left side currency changer device hardware components. The busy status indication is being provided relating to the left side currency changer device hardware components while the cash transaction is taking place. Accordingly, the user is provided an indication to continue inserting the currency into the currency changer device 14 until the cash transaction is completed. Upon completion of the transaction, the left side currency changer device hardware components go to the idle state. The left side currency changer device hardware components remain idle, and an indication of the idle state is presented to a user.

In another scenario, the left side currency changer device hardware components may provide an indication that the left side currency changer device hardware components are in the ready state. Upon receiving the indication that the left side currency changer device hardware components are in the ready state, however, a malfunction signal may be received relating to some portion of the left side currency changer device hardware components. Upon receiving the malfunction signal, however, the right side currency changer device hardware components are moved from the idle state to the ready state, and in indication is provided to the user to insert currency to begin the transaction. The left side currency changer device hardware components may then change to a fault state and the right side currency changer device hardware components continues to display the indication to the user to deposit the currency until the transaction is completed. Upon completion of the transaction, the right side currency changer device hardware components are changed to the idle state.

In yet another scenario, the right side currency changer device hardware components may provide an indication that the right side currency changer device hardware components are in the ready state. Thereafter, the right side currency changer device hardware components may provide an indication to the user to deposit currency associated with the cash transaction. Simultaneously therewith, the left side currency changer device hardware components may be in the idle state and an indication may be provided to the user that the left side currency changer device hardware components are idle. During the pendency of the cash transaction, an indication may be provided by the right side currency changer device hardware components that the currency changer device hardware components are busy. An indication may be provided to the user to continue to insert currency until the transaction is completed, at which point the right side currency changer device hardware components is returned to the idle state.

In still another scenario, the right side currency changer device hardware components may provide an indication that the right side currency changer device hardware components are in the ready state. Thereafter, the right side currency changer device hardware components may provide an indication to the user to deposit currency associated with the cash transaction. Simultaneously therewith, the left side currency changer device hardware components may provide an indication to a user requiring the user to wait prior to beginning a cash transaction. The left side currency changer device hardware components may also be placed in an idle state. While the cash transaction is being carried out, the right side currency changer device hardware components is changed to a busy state, and an indication is provided to the user to continue to deposit currency until the cash transaction is complete. Upon completion of the cash transaction, the right side currency changer device hardware components may be changed to the idle state, and an indication as such may be provided. Thereafter, the left side currency changer device hardware components may provide an indication that the left side currency changer device hardware components are in the ready state. Thereafter, the left side currency changer device hardware components may provide an indication to the user to deposit currency associated with the cash transaction. During the pendency of the cash transaction, an indication may be provided by the left side currency changer device hardware components that the currency changer device hardware components are busy. An indication may be provided to the user to continue to insert currency until the transaction is completed, at which point the right side currency changer device hardware components is returned to the idle state. The left side currency changer device hardware components may thereafter return to the idle state.

Figure 10:
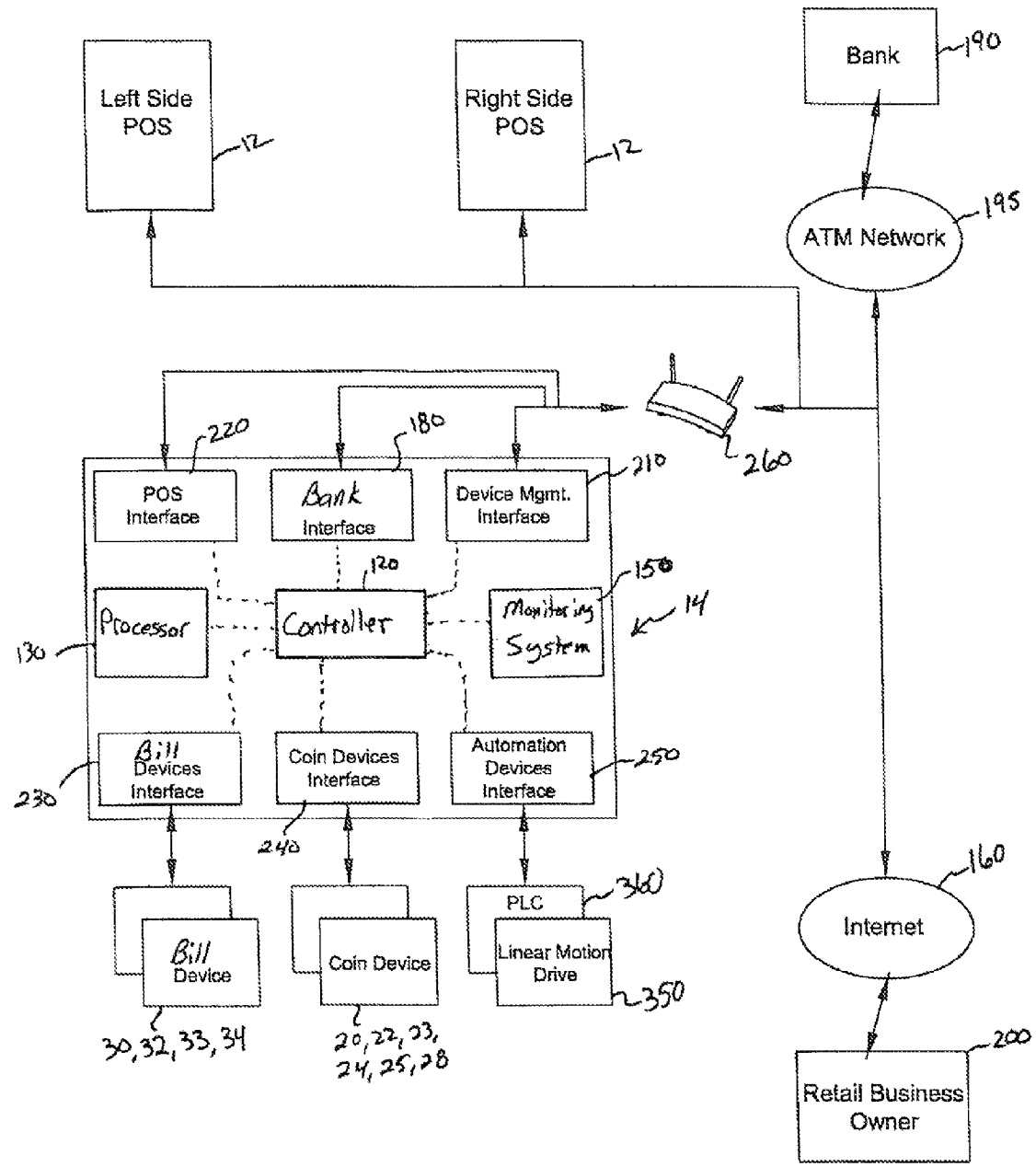
FIG. 10 is a schematic diagram of a banking interface of a currency changer device according to the present invention.

Referring now additionally to FIG. 10, a banking interface 180 of the currency changer device 14 according to the present invention is now described in greater detail. The banking interface 180 in preferably positioned in communication with the controller 120 and a global communications network 160, e.g., the internet, and is adapted to allow for a predetermined amount of currency contained within the currency changer device 14 to be provisionally deposited into a preselected bank account at a preselected bank 190. Upon provisionally depositing the predetermined amount of currency, the predetermined amount of currency becomes property of the preselected bank 190.

As illustrated, for example, in FIG. 10, the currency changer device 14 may include various interfaces to accomplish the goals, features, advantages and objects of the banking interface 180. More particularly, the banking interface 180 is in communication with the global communications network 160 so that the currency changer device 14 may be positioned in communication with various financial devices and institutions, i.e., an automatic teller machine (ATM) network 195, which may, in turn be in communication with the preselected bank 190, and which may be accessed via the internet 160 by a retail business owner 200, for example, or whoever may be authorized to access and initiate financial transactions associated with the currency changer device 14.

The currency changer device 14 may also include a device management interface 210 to provide an interface between the currency changer device 14 and the banking network, i.e., the preselected bank 190 and the ATM network 195 in the illustration, as well as a point of sale interface 220 to provide an interface between the point of sale terminals 12 and the currency changer device, as well as the banking network. As also illustrated, a bill device interface 230 may be included to provide an interface between each of the currency changer device hardware components associated with accepting and dispensing bills in a cash transaction associated with the currency changer device hardware components 99 and the banking network. Similarly, a coin device interface 240 may be included to provide an interface between each currency changer device hardware component associated with accepting and dispensing coins in a cash transaction associated with the currency changer device hardware components 99 and the banking network.

An automation device interface 250 may also be included to allow for an interface between all the currency changer device hardware components 99 and the banking network. As illustrated, the automation device interface 250 may be in communication with a linear motion drive 350 and a programmable logic controller 360 (PLC). The linear motion drive 350 may be an electro-mechanical device with the purpose of moving the coin cup (described above), that is connected to the drive shaft (described above), from the position where coins are being dispensed internally to the currency changer device to the position where coins are being dispensed externally to the currency changer device. The PLC 360, among other I/O handling functions, is adapted to control/command the operation of the linear motion drive 350. The PLC 360 is adapted to read input signals and send output signals to various hardware devices based on the pre-programmed logic.

As illustrated, the bank interface 180 relies on communication between the currency changer device 14, i.e., all of the currency changer device hardware components 99, the point of sale terminals 12, the internet 160, the retail business owner 200 (or a user authorized to initiate currency transactions for the currency changer device) and the bank network 190, 195. The communication is illustrated in FIG. 10 as taking place using a wireless router 260, for example. More particularly, the currency changer device 14 may be enabled with a Wi-Fi receiver to communication with a wireless router 260 and, in turn, the wireless router may be positioned in communication with the internet 160 so that communication between the currency changer device and the bank network 190, 195 may be readily accomplished. Those skilled in the art will appreciate, however, that any form of communication may be provided between the currency changer device 14 according to the present invention and the bank network 190, 195. The communication is preferably wireless, but those skilled in the art, after having had the benefit of reading this disclosure, will appreciate that a wired link may also be provided to place the currency changer device 14 in communication with the bank network 190, 195. Some types of wireless communication links that are contemplated by the present invention include, but are not limited to, Wi-Fi, Bluetooth®, radio network, cellular technology, or any other type of wireless communication link as understood by those skilled in the art.

Since the currency changer device 14 is positioned to be in communication with the bank network 190, 195 via the internet 160, then the status of the currency changer device hardware components 99 that contain currency can be remotely monitored. For example, a user authorized to initiate a currency transaction 200 may be able to monitor the amount of currency contained in each of the bill cassettes 32, 33 and each of the coin bins 24, 25. Further, the user may provide an indication of a predetermined amount that may be contained within each of the bill cassettes 32, 33 and each of the coin bins 24, 25 to initiate a provisional deposit. When the predetermined amount is set, a provisional deposit may automatically be made upon reaching that amount. The provisional deposit may be manually initiated by the user 200 at any given time. Further, any of the provisional deposits of currency may be made remotely, at the site of the currency changer device 14, or by using one of the point of sale terminals 12 associated with the currency changer device.

When the provisional deposit is made, and as described above, the currency contained in either the bill cassette 32, 33 or the coin bin 24, 25 becomes property of the preselected bank 190 to which the provisional deposit is made. In such a case, upon making of the provisional deposit, the bill cassette 32, 33 or coin bin 24, 25 from which the funds have been deposited are no longer used to accept currency or to dispense currency. Further, upon making the provisional deposit, a signal may be sent to a cash pickup service, i.e., an armored truck service, to pick up the bill cassette 32, 33 or coin bin 24, 25 that contains the currency that has been provisionally deposited into a bank account at the preselected bank 190. When the cash pickup service retrieves the bill cassette 32, 33 or coin bin 24, 25 that contains the currency that has been provisionally deposited, a new bill cassette or coin bin, i.e., an empty bill cassette or coin bin, may be replaced within the currency changer device 14. Upon replacing the bill cassette or coin bin, currency can again be deposited and dispensed therefrom.

As discussed above, the currency changer device advantageously allows a user 200 to remotely make provisional deposits. The user 200 may, for example, access a URL, enter a login identification and a password in order to be granted access to a secure account. The currency changer device 14 may then be located by entering a predetermined identifier, or some other information that will provide an identification and location of the currency changer device for which a provisional deposit is to be made. For enhanced security, it may be desirable for each currency changer device 14 to require a different password for access. For example, there may be a situation where a user is monitoring multiple currency changer devices and may wish to make provisional deposits from different currency changer devices. In such a case, it is desirable to ensure that the provisional deposit is being made from the proper currency changer device and, therefore the extra step of requiring another password may be needed.

After the currency changer device 14 is located, the user may inquire as to the balance of currency being held within the currency changer device. The balance inquiry may be very specific. For example, it is contemplated that the balance inquiry may be directed to the total balance within the currency changer device at the time of inquiry, or the balance inquiry may be directed to the amount of currency being held within each coin bin and each individual bill cassette. Upon determining the balance, the user may initiate the provisional deposit as desired. The provisional deposit may also be initiated, for example, from an ATM device. More specifically, the user may swipe a bank card associated with the preselected account, may enter a personal identification number, and may thereafter enter the amount to be provisionally deposited. The provisional deposit feature of the currency changer device 14 advantageously allows for enhanced cash management features being available to the user 200, including the ability to project cash forecasting reports, assist with budgeting matters, or any other type of financial reporting that may be advantageous to a user.

Figure 11:
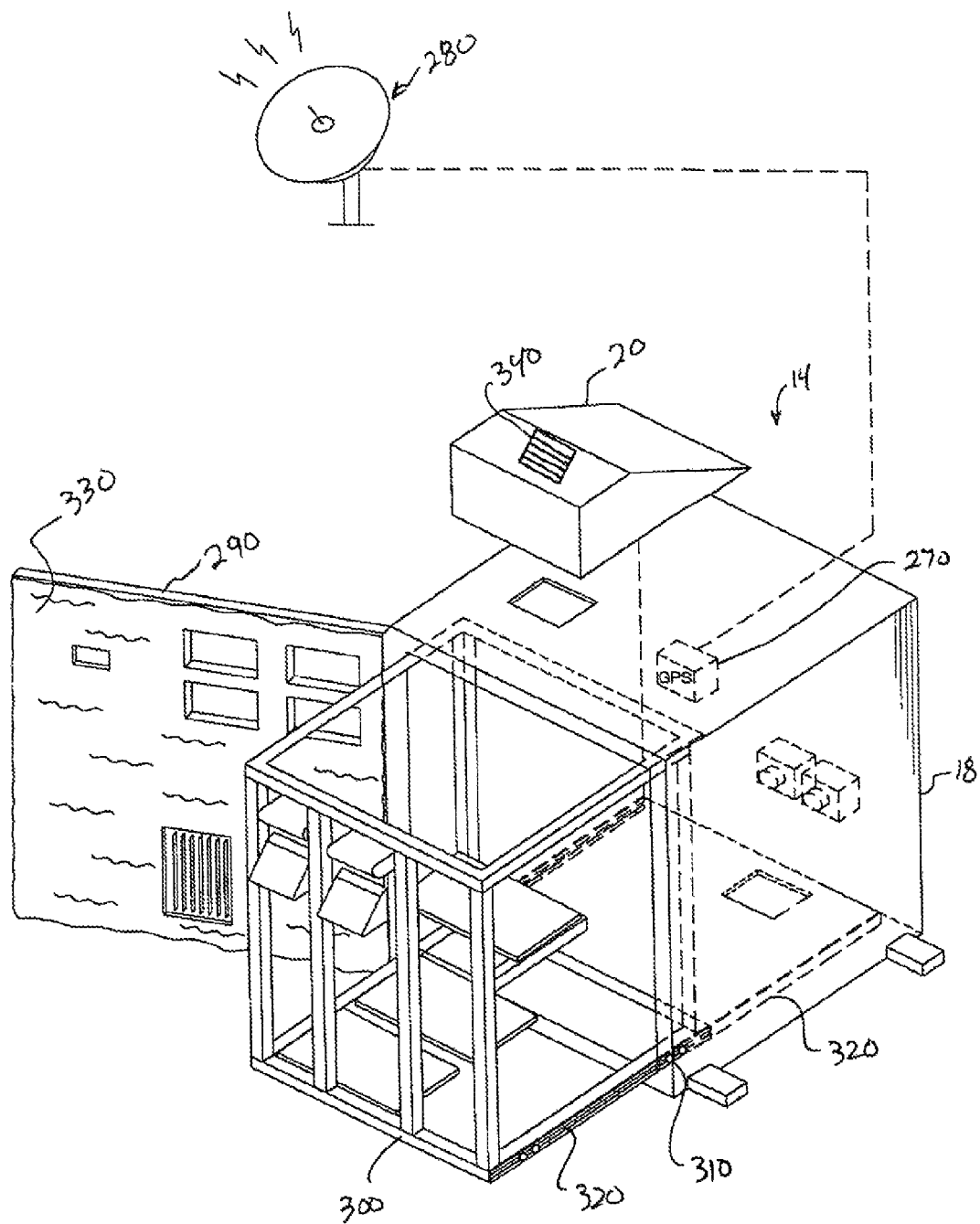
FIG. 11 is a perspective view of a currency changer device according to the present invention illustrating a frame adapted to carry currency changer hardware components and slidably engaging a housing of the currency changer device.

Referring now additionally to FIG. 11, additional features of the currency changer device 14 according to the present invention are now described in greater detail. More specifically, the currency changer device according to the present invention may include a global positioning system (GPS) 270. The GPS 270 may be carried by the housing 18 and positioned in communication with the controller 120 (not shown) and a global communications network 160 (not shown) so that a location of the currency changer device 14 may be remotely monitored. As is typical, most GPS devices communicate with a satellite 280 to determine position location. This advantageously enhances security of the currency changer device 14 according to the present invention as it allows for the location of the currency changer device to be constantly monitored. For example, in the case of a theft of a currency changer device, the location thereof may be readily attained using the GPS system 270.

Additional security features of the currency changer device 14 are contemplated by the present invention. For example, a front door 290 of the housing 18 of the currency changer device 14 may include security features that must be activated in order for the front door to be opened. More specifically, a key pad may be carried by the front door 290 of the housing 18 of the currency changer device 14 and positioned in communication with the controller 120 so that a predetermined code must be entered in order for the front door of the currency changer device to be opened. Further, the present invention contemplates the use of biometric sensors carried by the front door 290 of the housing 18 of the currency changer device 14 in order for the front door to be opened. More specifically, the biometric sensor may, for example, require a thumbprint identification to be used in order for the front door 290 of the housing 18 of the currency changer device 14 to be opened. Similarly, other biometric sensors may be used such as, for example, an eye scanner, or any other type of biometric sensor as understood by those skilled in the art.

Additional features of the housing 18 of the currency changer device 14 according to the present invention are now described in greater detail with additional reference to FIG. 11. More specifically, the currency changer device 14 may include a frame 300 carried by the housing 18. Each of the plurality of currency changer device hardware components 99 may be carried by the frame 300. Accordingly, in such a configuration, each of the currency changer device hardware components 99 are connected to the frame 300, and not connected to the housing 18. The frame 300 may be slidably connected to the housing 18 so that the frame may be moved between an extended position and an inserted position. The extended position may be defined as at least a portion of the frame 300 being positioned exterior to the housing 18. The inserted position may be defined as the frame 300 being positioned substantially within the housing 18. The frame 300 is illustrated in the extended position in FIG. 11.

More specifically, it is preferable that the inserted position be defined as the frame 300 being completed contained within the housing 18 so that the door 290 of the housing may be readily closed and the frame carrying all of the currency changer device hardware components 99 may be positioned completely within the housing. The slidable connection between the frame 300 and the housing 18 advantageously allows for the currency changer device hardware components 99 to be readily accessed when needed. For example, in the case of a malfunction or a failure of one of the plurality of currency changer device hardware components, the frame 300 may be readily moved from the inserted position to the extended position so that the currency changer device hardware components 99 may be accessed for maintenance or replacement.

The housing may include a plurality of rollers 310 that are positioned to engage portions of the frame 300 so that the frame can be readily slidably moved between the extended and inserted positions. Rollers 310 are preferable as they allow for minimal effort to be used to move the frame 300 between the extended position and the inserted position. Those skilled in the art, after having had the benefit of this disclosure, will also appreciate that other types of configurations allowing for a slidable connection between the frame 300 and the housing 18 may also be used. For example, mating track members 320 may be connected to both an interior portion of the housing 18 and portions of the frame 300 so that the mating track members engage one another to allow for the frame to be moved between the extended position and inserted position. Such a configuration may also use rollers 310 for ease of movement.

As also illustrated in FIG. 11, the housing 18 of the currency changer device 14 may also include sound insulating material 330 carried by interior wall portions thereof. The sound insulating material 330 may, for example, be a foam material, or any other type of material suitable for dampening noise associated with use of the currency changer device 14. Such noise may, for example, include coins being inserted to any of the plurality of coin bins 24, 25. This advantageously enhances use of the currency changer device 14 by providing a device having decreased noise output. Although the sound insulating material 330 is only illustrated as being positioned on the front door 290 of the housing 18 in FIG. 11, the present invention contemplates that the sound insulating material may be positioned on all interior wall portions of the housing. Of course, cutouts will be provided where necessary so that use of the currency changer device hardware components 99 of the currency changer device 14 are not interfered with.

The currency changer device 14 may also include a coin intake cover mechanism 340 carried by the coin accepting tray 20 which, in turn, is carried by the housing 18. The coin intake cover mechanism 340 may be positioned in communication with the controller 120. Further, the coin intake cover mechanism 340 may be adapted to be moved between an uncovered position when the currency changer device 14 is ready to accept coins and in a covered position when the currency changer device is not ready to accept coins. This may be determined responsive to a signal received from the controller 120. Accordingly, the coin intake cover mechanism 340 advantageously prevents foreign objects from being lodged in the coin accepting tray 20, which may prevent coins from being accepted into the currency changer device 14. The coin intake cover mechanism 340 may, for example, be provided by a moveable door that covers the area where coins may be deposited into the coin accepting tray 20. The door is moveable between opened and closed positions depending on the status of the currency changer device 14, i.e., depending on whether or not the currency changer device is ready to accept coins.

Many modifications and other embodiments of the invention will come to the mind of one skilled in the art having the benefit of the teachings presented in the foregoing descriptions and the associated drawings. Therefore, it is understood that the invention is not to be limited to the specific embodi- That which is claimed is:

1. A currency changer device for use with at least one point of sale terminal comprising:
   a housing;
   a coin accepting tray carried by the housing for accepting a plurality of coins in bulk;
   a bill accepter carried by the housing for accepting and sorting a plurality of bills in bulk;
   a first and a second coin sorter each in communication with the coin accepting tray, wherein the first and the second coin sorter are independent of each other;
   a first and a second plurality of respective coin bins in communication with the respective first and second coin sorters for receiving a respective plurality of similar coins, wherein the first and the second plurality of respective coin bins are independent of each other; a first and a second plurality of bill cassettes in communication with the bill accepter for receiving and dispensing a respective plurality of similar bills, wherein the first and the second plurality of respective bill cassettes are independent of each other;
   a coin dispenser carried by the housing and in communication with the first and second plurality of respective coin bins to dispense a plurality of coins;
   a bill dispenser carried by the housing and in communication with the first and the second plurality of bill cassettes to dispense a plurality of bills;
   a controller in communication with each of the first and the second coin sorters, the first and the second plurality of respective coin bins, and the first and the second plurality of bill cassettes; and
   a frame carried by the housing;
   wherein the currency changer device accepts a plurality of unsorted coins in bulk and a plurality of unsorted bills in bulk for a cash transaction, and wherein the currency changer device dispenses change in a cash transaction responsive to commands received from the at least one point of sale terminal;
   wherein currency is selectively deposited into either the coin bins and bill cassettes associated with the first currency changer device hardware components or the coin bins and bill cassettes associated with the second currency changer device hardware components responsive to the controller; and
   wherein the coin dispenser is in communication with a coin cup to receive the plurality of coins; and
   wherein the coin cup is in communication with a coin cup shaft that lifts and rotates the coin cup to dispense the plurality of coins.

2. A currency changer device according to claim 1 further comprising a monitoring system in communication with the controller and each of the first and second coin sorters, the first and second plurality of respective coin bins, and the first and second plurality of bill cassettes to monitor each of the first and second coin sorters, the first and second plurality of respective coin bins, and the first and second plurality of bill cassettes.

3. A currency changer device according to claim 2 wherein the monitoring system transmits a malfunction signal upon detecting a malfunction of any of the first and second coin sorters, the first and second plurality of respective coin bins, and the first and second plurality of bill cassettes to define a malfunctioning component.

4. A currency changer device according to claim 3 wherein upon receipt of the malfunction signal, the malfunctioning component is deactivated, and currency transactions are rerouted to a backup component relating to at least one of the first and second coin sorters, the first and second plurality of respective coin bins, and the first and second plurality of bill cassettes.

5. A currency changer device according to claim 1 wherein the currency changer device is adapted to be simultaneously used with two point of sale terminals.

6. A currency changer device according to claim 1 further comprising a load balancing system in communication with the controller to balance the amount of currency being deposited into and dispensed out of the coin bins and bill cassettes associated with the first coin sorter, the first plurality of respective coin bins, and the first plurality of bill cassettes with the currency being deposited into and dispensed out of the coin bins and bill cassettes associated with the second coin sorter, the second plurality of respective coin bins, and the second plurality of bill cassettes.

7. A currency changer device according to claim 1 further comprising a banking interface in communication with the controller and a global communications system.

8. A currency changer device according to claim 7 wherein the banking interface allows for an amount of currency contained within the currency changer device to be provisionally deposited into a bank account at a bank.

9. A currency changer device according to claim 8 wherein upon provisionally depositing the amount of currency, the amount of currency becomes property of the bank.

10. A currency changer device according to claim 8 wherein the amount of currency is provisionally deposited remotely via the global communications network.

11. A currency changer device according to claim 1 further comprising a Global Positioning System (GPS) carried by the housing and in communication with the controller and a global communications network so that a location of the currency changer device may be remotely monitored.

12. A currency changer device according to claim 1 wherein the frame is slidably connected to the housing.

13. A currency changer device according to claim 12 wherein the housing includes a plurality of rollers positioned to engage portions of the frame so that the frame can be slidably moved between an extended position and an inserted position, wherein the extended position is defined as at least a portion of the frame being positioned exterior the housing, and wherein the inserted position is defined as at least a portion of the frame being positioned within the housing.

14. A currency changer device according to claim 1 further comprising sound insulating material carried by interior wall portions of the housing.

15. A currency changer device according to claim 1 further comprising a coin intake cover mechanism carried by the housing adjacent the coin accepting tray and in communication with the controller; wherein the coin intake cover mechanism is adapted to be moved between an uncovered position when the currency changer device is ready to accept coins and a covered position when the currency changer device is not ready to accept coins responsive to a signal received from the controller.

16. A currency changer device for use with at least one point of sale terminal comprising:
   a housing;
   a coin accepting tray carried by the housing for accepting a plurality of coins in bulk;
   a bill accepter carried by the housing for accepting a plurality of bills in bulk;

a respective plurality of currency changer device hardware components carried by the housing;
a coin dispenser carried by the housing to dispense a plurality of coins; and
a bill dispenser carried by the housing to dispense a plurality of bills;
a controller in communication with each of the respective plurality of currency changer device hardware components;
a banking interface in communication with the controller and a global communications system; and
wherein the currency changer device accepts a plurality of unsorted coins in bulk and a plurality of unsorted bills in bulk for a cash transaction, and dispenses change in a cash transaction responsive to commands received from the at least one point of sale terminal;
wherein the banking interface allows for an amount of currency contained within the currency changer device to be provisionally deposited into a bank account at a bank;
wherein upon provisionally depositing the amount of currency, the amount of currency is not available to be dispensed from the currency changer device;
wherein the amount of currency can be provisionally deposited remotely via the global communications network; and
wherein the coin dispenser is in communication with a coin cup to receive the plurality of coins; and
wherein the coin cup is in communication with a coin cup shaft that lifts and rotates the coin cup to dispense the plurality of coins.

17. A currency changer device according to claim 16 further comprising a currency changer device hardware component monitoring system in communication with the controller and each of the respective plurality of currency changer device hardware components to monitor each of the respective plurality of currency changer device hardware components; wherein the currency changer device hardware component monitoring system transmits a malfunction signal upon detecting a malfunction of one of the plurality of currency changer device hardware components to define a malfunctioning component.

18. A currency changer device according to claim 16 further comprising a Global Positioning System (GPS) carried by the housing and in communication with the controller and the global communications network so that a location of the currency changer device may be remotely monitored.

19. A currency changer device according to claim 16 further comprising a frame carried by the housing, and wherein each of the plurality of currency changer device hardware components are carried by the frame; and wherein the frame is slidably connected to the housing.

20. A currency changer device according to claim 19 wherein the housing includes a plurality of rollers positioned to engage portions of the frame so that the frame can be slidably moved between an extended position and an inserted position, wherein the extended position is defined as at least a portion of the frame being positioned exterior the housing, and wherein the inserted position is defined as at least a portion of the frame being positioned within the housing.

21. A currency changer device according to claim 16 further comprising sound insulating material carried by interior wall portions of the housing.

22. A currency changer device according to claim 16 further comprising a coin intake cover mechanism carried by the housing adjacent the coin accepting tray and in communication with the controller; wherein the coin intake cover mechanism is adapted to be moved between an uncovered position when the currency changer device is ready to accept coins and a covered position when the currency changer device is not ready to accept coins responsive to a signal received from the controller.

23. A currency changer device for use with at least one point of sale terminal comprising:
a housing;
a coin accepting tray carried by the housing for accepting a plurality of coins in bulk;
a bill accepter carried by the housing for accepting a plurality of bills in bulk;
a respective plurality of currency changer device hardware components carried by the housing;
a coin dispenser carried by the housing to dispense a plurality of coins; and
a bill dispenser carried by the housing to dispense a plurality of bills;
a controller in communication with each of the respective plurality of currency changer device hardware components;
a frame carried by the housing, wherein each of the plurality of currency changer device hardware components are carried by the frame and wherein the frame is slidably connected to the housing;
a plurality of rollers carried by the housing and positioned to engage portions of the frame so that the frame can be slidably moved between an extended position and an inserted position, wherein the extended position is defined as at least a portion of the frame being positioned exterior the housing, and wherein the inserted position is defined as at least a portion of the frame being positioned within the housing;
sound insulating material carried by interior wall portions of the housing;
a Global Positioning System (GPS) carried by the housing and in communication with the controller and the global communications network so that a location of the currency changer device may be remotely monitored; and
an automation device interface to move coins from a position where the coins are dispensed internally from the coin bins to a position where the coins are dispensed externally to the coin dispenser;
wherein the currency changer device accepts a plurality of unsorted coins in bulk and a plurality of unsorted bills in bulk for a cash transaction, and dispenses change in a cash transaction responsive to commands received from the at least one point of sale terminal;
wherein the coin dispenser is in communication with a coin cup to receive the plurality of coins; and
wherein the coin cup is in communication with a coin cup shaft that lifts and rotates the coin cup to dispense the plurality of coins.

24. A currency changer device according to claim 23 further comprising a currency changer device hardware component monitoring system in communication with the controller and each of the respective plurality of currency changer device hardware components to monitor each of the respective plurality of currency changer device hardware components; wherein the currency changer device hardware component monitoring system transmits a malfunction signal upon detecting a malfunction of one of the plurality currency changer device hardware components to define a malfunctioning component.

25. A currency changer device according to claim 23 further comprising a banking interface in communication with the controller and a global communications system and allows for an amount of currency contained within the currency changer device to be provisionally deposited into a bank account at a bank.

26. A currency changer device according to claim 25 wherein upon provisionally depositing the amount of currency, the amount of currency becomes property of the bank.

27. A currency changer device according to claim 26 wherein the amount of currency can be provisionally deposited remotely via the global communications network.

28. A currency changer device according to claim 23 further comprising a coin intake cover mechanism carried by the housing adjacent the coin accepting tray and in communication with the controller; wherein the coin intake cover mechanism is adapted to be moved between an uncovered position when the currency changer device is ready to accept coins and a covered position when the currency changer device is not ready to accept coins responsive to a signal received from the controller.

29. A currency changer device according to claim 4 wherein upon at least one of the first and second coin sorters, the first and second plurality of respective coin bins, and the first and second plurality of bill cassettes malfunction, the other of the first and second coin sorters, the first and second plurality of respective coin bins, and the first and second plurality of bill cassettes continues operation thereof.

30. A currency changer device according to claim 16 further comprising a load balancing system in communication with the controller to balance the amount of currency being deposited into and dispensed out of the coin bins and bill cassettes associated with one of the respective plurality of currency changer device hardware components with the currency being deposited into and dispensed out of the coin bins and bill cassettes associated with another of the respective plurality of currency changer device hardware components.

* * * * *